US012808889B2

(12) United States Patent
Fernandez De Castro et al.

(10) Patent No.: US 12,808,889 B2
(45) Date of Patent: Nov. 24, 2026

(54) FLUID HANDLING SYSTEMS WITH FUNCTION CHECKS

(71) Applicant: Beckman Coulter, Inc., Brea, CA (US)

(72) Inventors: Juan J. Fernandez De Castro, Miami, FL (US); Valentin T. Quesada, Miami Lakes, FL (US); Mark F. Sauerburger, Zionsville, IN (US)

(73) Assignee: Beckman Coulter, Inc., Brea, CA (US)

( * ) Notice: Subject to any disclaimer, the term of this patent is extended or adjusted under 35 U.S.C. 154(b) by 307 days.

(21) Appl. No.: 18/579,245

(22) PCT Filed: Jul. 14, 2022

(86) PCT No.: PCT/US2022/037225
§ 371 (c)(1),
(2) Date: Jan. 12, 2024

(87) PCT Pub. No.: WO2023/288032
PCT Pub. Date: Jan. 19, 2023

(65) Prior Publication Data

US 2024/0329067 A1 Oct. 3, 2024

Related U.S. Application Data

(60) Provisional application No. 63/222,076, filed on Jul. 15, 2021.

(51) Int. Cl.
*G01N 35/00* (2006.01)
*G01N 35/10* (2006.01)

(52) U.S. Cl.
CPC . *G01N 35/00623* (2013.01); *G01N 35/00693* (2013.01); *G01N 35/0099* (2013.01); *G01N 35/1016* (2013.01); *G01N 2035/1025* (2013.01)

(58) Field of Classification Search
CPC .......... G01N 35/0099; G01N 35/1016; G01N 35/00693; G01N 2035/1025; G01N 35/00623
See application file for complete search history.

(56) References Cited

U.S. PATENT DOCUMENTS 4,736,638 A 4/1988 Okawa et al.
4,912,976 A 4/1990 Labriola, II
(Continued)

FOREIGN PATENT DOCUMENTS

EP 3078972 A1 10/2016
EP 3614151 A1 2/2020

OTHER PUBLICATIONS

International Search Report and Written Opinion for International Patent Appl. No. PCT/US2022/037225 (Nov. 24, 2022).

*Primary Examiner* — Jamel E Williams
(74) *Attorney, Agent, or Firm* — Merchant & Gould P.C.

(57) ABSTRACT

A method for performing a function check of a fluid handling system can comprise dispensing a first reference dose of a fluid into a reference container using a first fluid dispenser, measuring a first fluid height of the first reference dose in the reference container with a fluid level sensing system of the fluid handling system, and changing a status of the fluid handling system based on the first measured first fluid height. Robotic fluid handling system can comprise controllers and computer readable memory configured to execute the methods described herein.

19 Claims, 16 Drawing Sheets

(56) References Cited

U.S. PATENT DOCUMENTS

| | | | | |
|---|---|---|---|---|
| 7,275,430 | B2 | 10/2007 | Zuleta et al. | |
| 2010/0097231 | A1 * | 4/2010 | Elsenhans | G01F 23/268<br>702/55 |
| 2020/0105409 | A1 * | 4/2020 | Kochar | G16H 40/67 |

* cited by examiner

FLUID HANDLING SYSTEMS WITH FUNCTION CHECKS

This application is a U.S. National Stage Application of PCT/US2022/037225 filed on Jul. 14, 2022, which claims the benefit of and priority to U.S. Provisional Patent Application No. 63/222,076, filed Jul. 15, 2021, the entire contents of which are incorporated herein by reference. To the extent appropriate, a claim of priority is made to each of the above-disclosed applications.

TECHNICAL FIELD

The present application relates generally, but not by way of limitation, to fluid handling systems, such as those that can be used in various applications to combine reagents (e.g., liquid reagents and solvents) or other fluids. More particularly, the present application relates to systems and methods for checking or validating operation of a robotic fluid handling system such that operation of a fluid dispensing system or fluid dispenser can be determined.

BACKGROUND

Many fluid handling systems are configured to be loaded with containers of liquids for performing library constructions (e.g., libraries of DNA or RNA fragments for sequencing) using a plurality of reagents and solvents. To perform library construction on samples using a fluid handling system, such as a liquid handler, the fluid handling system is typically set-up by an operator or user. Set-up can include loading samples, library construction reagents, and various items of labware, such as pipette tips, plate lids, and liquid containers of various types and configurations, including reservoirs, microtiter plates, test tubes, vials, microfuge tubes, and the like. However, fluid handling systems can be configured to perform many different types of procedures with different types of fluid dispensers.

Before the operator initiates the system to perform a procedure, it is desirable for the operator to check that the fluid handling system is functioning properly. Typically, two different types of function checks are conducted. The first is a general quality control check that verifies macro-operation of the fluid dispenser components, such as valves, pumps, tubing, etc. The second is a calibration check that verifies micro-operation of the fluid dispenser components to be able to determine if accurate volumetric dispensing of liquid is occurring.

For the macro-operation quality control check, the typical method involves performing gravimetric measurements with an analytical balance. The fluid handling system is operated in an operating mode to transfer a specified volume of liquid from a source bottle to a target vial, such as a test tube, loaded into the fluid handling system. The operator then weighs the target vial, having first tared the target vial, to obtain a measurement of the volume of liquid transferred to the target vial. The operator then manually compares the measured volume to a predetermined expected target range of the specified volume. If the volume falls within the target range, the system is considered to have passed quality control. If the measured volume falls outside of the target range, the system is considered to have failed quality control, thereby requiring the operator to seek further action to correct potential problems. For example, the operator can check that tubes are properly connected within the fluid handling system or call service for maintenance support.

For the micro-operation calibration check, the typical method involves using dyes, such as fluorescent or absorbent dyes, and microplate readers. A fluid dispenser can be used to move an expected volume of liquid into a container. The container can then be scanned by a reader that can analyze the dyed liquid to determine the volume of liquid in the container. If there is a discrepancy between the dispensed volume and the requested volume, the operator can reprogram the fluid handling system to dispense more or less liquid from what is requested in order to compensate for the difference.

Overview

The present inventors have recognized, among other things, that problems to be solved in performing functions checks in fluid handling systems involve the need for manually intensive operations. For example, the previously mentioned analytic balance and microplate reader approaches require the operator to physically move the target vial or container to another location, i.e., the balance or reader. The balance and reader are also an additional expense and require operator know-how and consumables, such as dye. Additionally, the operator can unnecessarily have to inspect multiple components of the fluid handling system, such as hoses, pumps and the like. Furthermore, in the case of the calibration check, the fluid handling system needs to be reprogrammed. Thus, previous function checks require a significant amount of operator attention and lengthy time periods to perform the function checks.

The present subject matter can provide solutions to these problems and other problems, such as by providing a fluid handling system that can perform function checks or performance checks without or with minimal operator intervention using, for example, native level sensing capabilities of the fluid handling system. In examples, the level sensing capabilities can provide accurate level readings that can be converted to volume measurements to thereby check operation of the fluid handling system hardware and the accuracy of the fluid dispenser, including pipette tips and syringe probes. The level sensing capabilities can be incorporated into the operating system of the fluid handling system so that the function checks or performance checks can be performed with minimal or no operator interaction.

In an example, a method for performing a function check of a fluid handling system can comprise dispensing a first reference dose of a fluid into a reference container using a first fluid dispenser, measuring a first fluid height of the first reference dose in the reference container with a fluid level sensing system of the fluid handling system, determining if the first measured reference fluid height is above or below a threshold height, and changing a status of the fluid handling system based on the first measured reference fluid height relative to the threshold height.

In an example, a method for performing a function check of a fluid handling system can comprise dispensing a reference fluid into a reference container using a fluid dispenser, measuring a reference fluid level in the reference container with a fluid level sensing system of the fluid handling system, evaluating functionality of the fluid handling system from the reference fluid level, and changing a status of the fluid handling system based on the evaluated functionality.

In another example, a robotic fluid handling system can comprise a controller, a stationary deck, a fluid reservoir positioned on the deck, a transport device controlled by the controller to move in three-dimensional space, and a fluid dispenser configured to dispense fluid into the fluid reservoir, the fluid dispenser arranged and adapted to be moved in three-dimensional space by the transport device, the fluid dispenser comprising a capacitance sensor, wherein the controller is configured to detect contact of the fluid dispenser with a liquid level in the fluid reservoir based on the amount of capacitance sensed by the capacitance sensor, wherein the controller is further configured to determine operability of the robotic fluid handling system based on the sensed capacitance.

DETAILED DESCRIPTION

Figure 1:
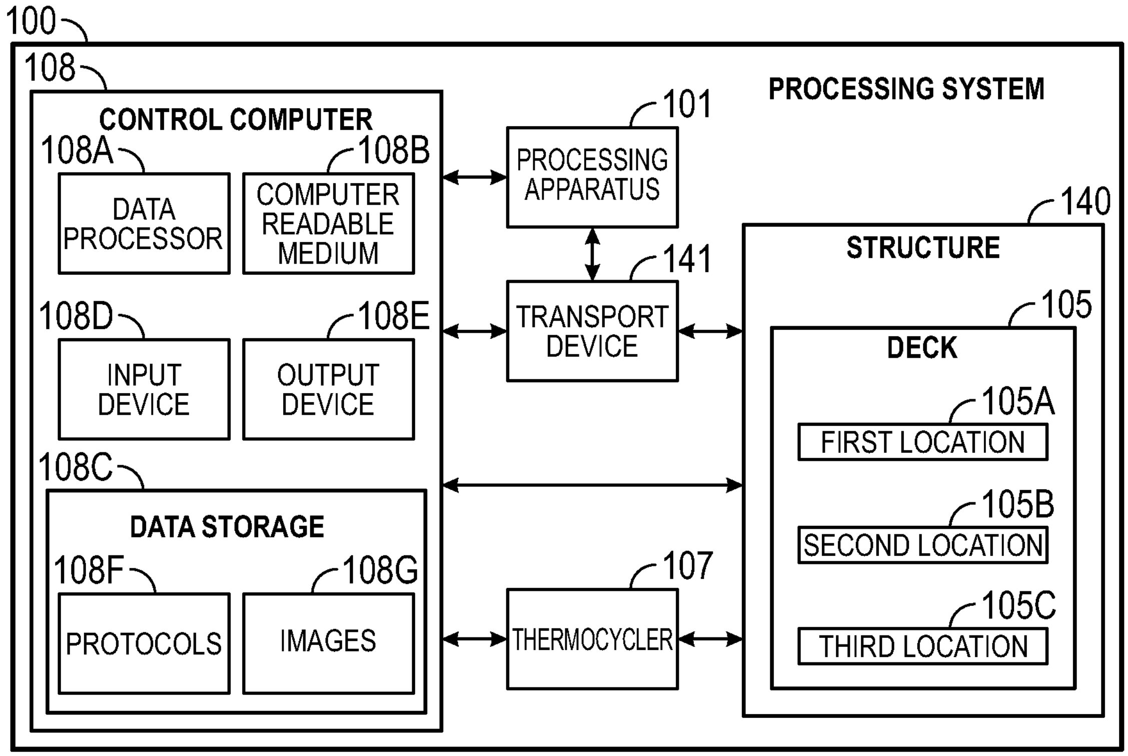
FIG. 1 is a block diagram of a robotic fluid handling system according to an example of the present disclosure.

FIG. 1 is a high-level block diagram of processing system 100 according to an embodiment of the disclosure. Processing system 100 can comprise a liquid or fluid handling system with which function checks of the present disclosure can be executed. Processing system 100 can comprise control computer 108 operatively coupled to structure 140, transport device 141, processing apparatus 101 and thermocycler system 107. Input/output interfaces can be present in each of these devices to allow for data transmission between the illustrated devices and external devices. Processing system 100 can comprise a robotic fluid handling system as described herein. Fluids can include various liquids such as reagents and the like. Exemplary processing systems in which the present disclosure can be implemented are the Biomek i7 Automated Workstation, and the NGeniuS, each of which are marketed by Beckman Coulter, Inc. of Brea, California.

For explanatory purposes, processing system 100 will mainly be described as a system for processing and analyzing biological samples, such as the preparation of libraries of nucleic acid fragments (e.g., libraries of fragments derived from DNA or RNA molecules) including next-generation sequencing (NGS) libraries. For example, embodiments of the present disclosure can include thermocycling and incubating reagents in a reaction vessel loaded into a thermocycling system, wherein the single reaction vessel and the single thermocycling system can perform a plurality of different heating functions for different liquids loaded therein. Processing system 100 can additionally be representative of other types of fluid handling systems, such as those similar to what is shown and described with reference to FIGS. 11 and 12. In order to properly process reagents and specimen within the systems processing modules (e.g., a reaction vessel), and provide other functionality of a fluid handling system, it can be desirable to verify operation of various physical (e.g., mechanical) components of the fluid processing system. The control processing system 100 can be used to verify these system modules and subsystem components and to also calibrate a working tool, e.g., a fluid dispenser, configured to deliver the reagents or specimen to a module vessel or sub system.

Figure 5:
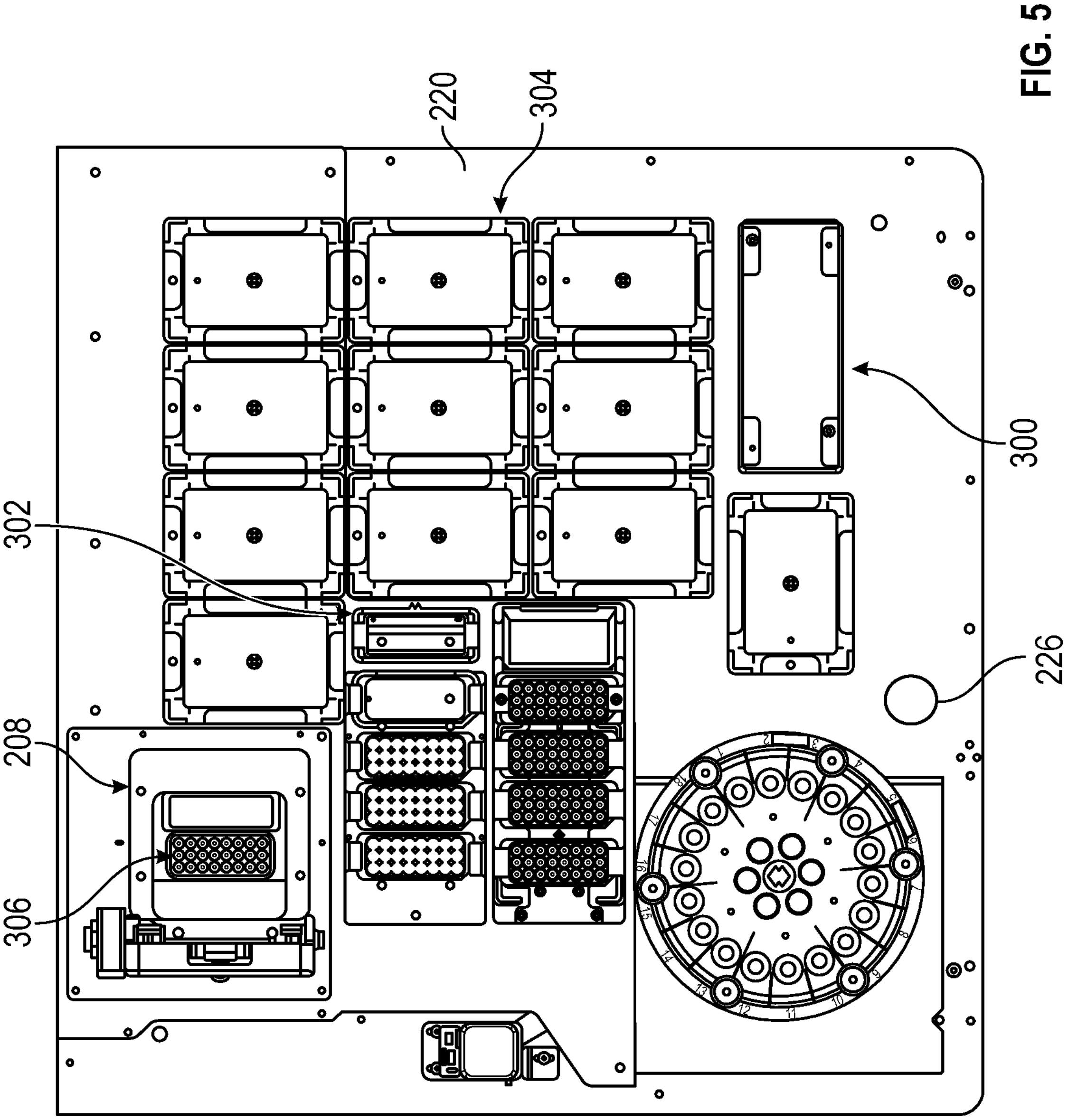
FIG. 5 is a plan view of the deck of FIG. 4 without the items of labware loaded thereon to show a bulk reservoir holder, a labware holder for reaction vessels, a labware holder for tip boxes or microplates and a thermocycler reservoir holder.

Structure 140 can include a housing (e.g., housing 202 of FIG. 2), legs or casters to support the housing, power source, deck 105 loadable within the housing, and any other suitable feature. Deck 105 can hold permanently attached modules for the automated performance of a plurality of flow cytometry assays (processing apparatus 101). Additionally, deck 105 can include a physical surface (e.g., platform 212 of FIG. 2) such as a planar physical surface upon which components can be reversibly placed and accessed for experiments, analyses, and processes. In some instances, deck 105 can be a floor or a tabletop surface. Deck 105 can be subdivided into a plurality of discrete deck locations (e.g., locations L1-L16 of FIG. 3) for placing different components. The locations can be directly adjacent or can be spaced apart from each other. Each deck location can include dividers, inserts, and/or any other support structure for separating the different deck locations and containing components, as shown in FIG. 5. For exemplary purposes, FIG. 1 shows first location 105A, second location 105B, and third location 105C on deck 105, though additional locations can be included. One or more of locations 105A-105C can be loaded with a carousel (e.g., carousel 204 of FIG. 2) or one or more reaction vessels (e.g. reaction vessel 205 of FIG. 2) that can include spaces for holding one or more components, such as vials of liquid. As described in greater detail below, deck 105 can additionally be provided with a well having tightly controlled tolerances to provide a reference volume for performing function checks described herein.

Figure 3:
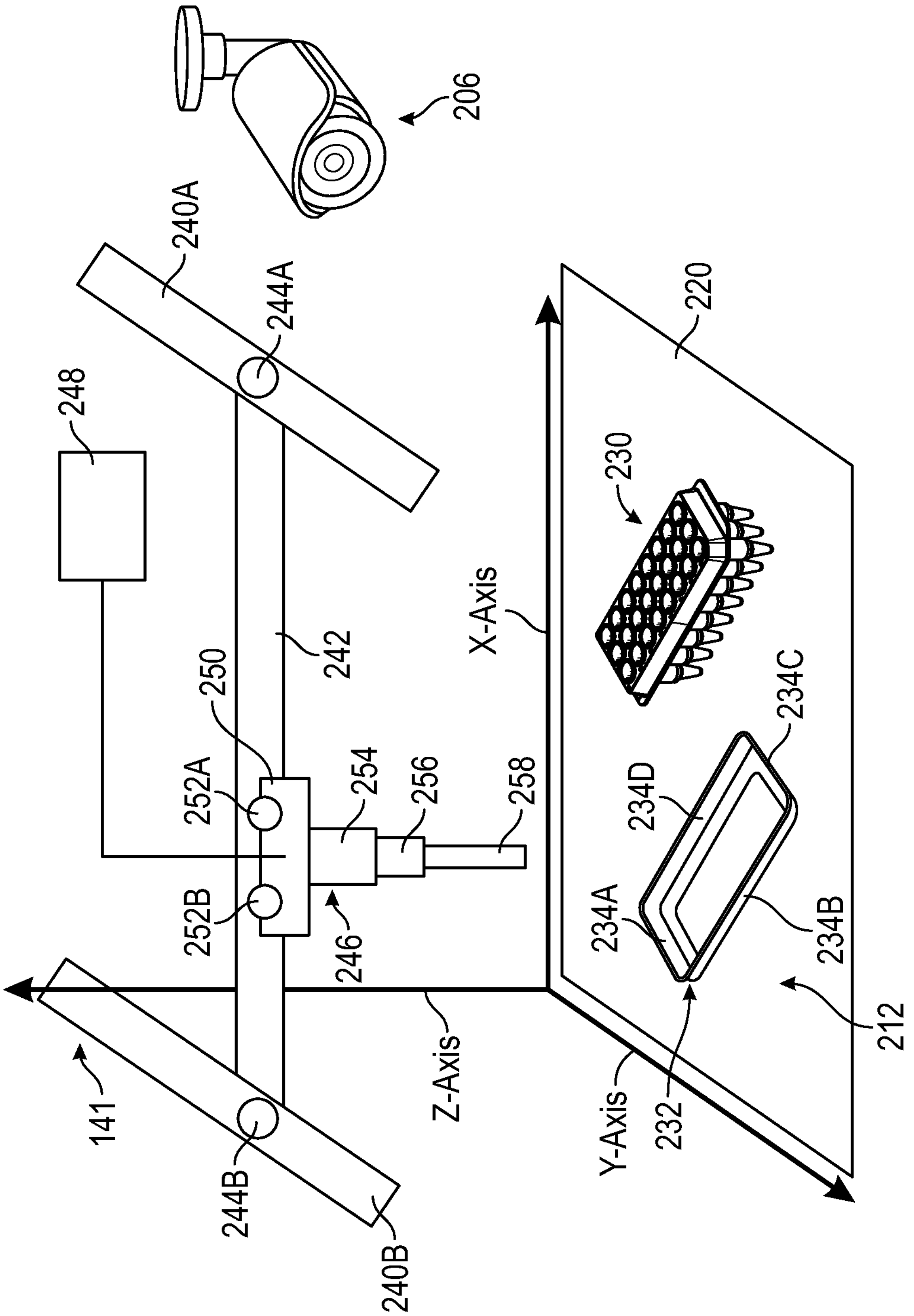
FIG. 3 a schematic diagram illustrating an item of labware, a labware receptacle, a transport device and an imaging device positioned relative to a deck, further illustrated in FIGS. 4 and 5.

Transport device 141 can comprise a trolley, bridge or carriage system having moving capabilities in X and Y directions and hoisting capabilities in a Z direction (see FIG. 3). Transport device 141 can represent multiple transport devices, can prepare and/or transport components between deck 105 and processing apparatus 101, as well as between different locations on deck 105. Examples of transport devices can include conveyors, cranes, sample tracks, pick and place grippers, laboratory transport elements that can move independently (e.g., pucks, hubs or pedestals), robotic arms, and other tube or component conveying mechanisms. Transport device 141 can comprise a mandrel (e.g., mandrel 254 of FIG. 3) or a fixed probe arrangement that is attached to a syringe pump housing (e.g., housings 822A-822D of FIG. 12), mandrels may be fitted with working tools and also function check tools can be mounted. In some embodiments, the working tool mounted to transport device 141 comprises a fluid dispenser, such as a pipetting head or fixed probe (that can use s, for example) configured to transfer liquids. A pipetting head can transfer liquids within removable pipette tips and can include a single displaceable piston configured to actuate each pipettor simultaneously. Pipette tips can be attached to the pipetting head and can be disposed of after each use. A plurality of fixed probes can be attached to one or multiple syringes for transferring fluid volumes in individually actuatable channels. The fixed fluid transfer probes can be cleaned at a wash station within processing system 100 and can be reused multiple times. Pipetting heads and syringe heads can also include grippers suitable for grasping or releasing other labware, such as microwell plates.

Processing apparatus 101 can include any number of machines or instruments for executing any suitable process. For example, processing apparatus 101 can include an analyzer, which can include any suitable instrument that is capable of analyzing a sample such as a biological sample. Examples of analyzers include spectrophotometers, luminometers, mass spectrometers, immunoanalyzers, hematology analyzers, microbiology analyzers, flow cytometers, and/or molecular biology analyzers. In some embodiments, processing apparatus 101 can include a sample staging apparatus. A sample staging apparatus can include a sample presentation unit for receiving sample tubes with biological samples, a sample storage unit for temporarily storing sample tubes or sample retention vessels, a means or device for aliquotting a sample, such as an aliquottor, a means for holding at least one reagent pack comprising the reagents needed for an analyzer, and any other suitable features. Processing apparatus 101 can further comprise a device for mixing the specimen and a shaker or stirrer for agitating or mixing liquids and reagents, etc.

Figure 2:
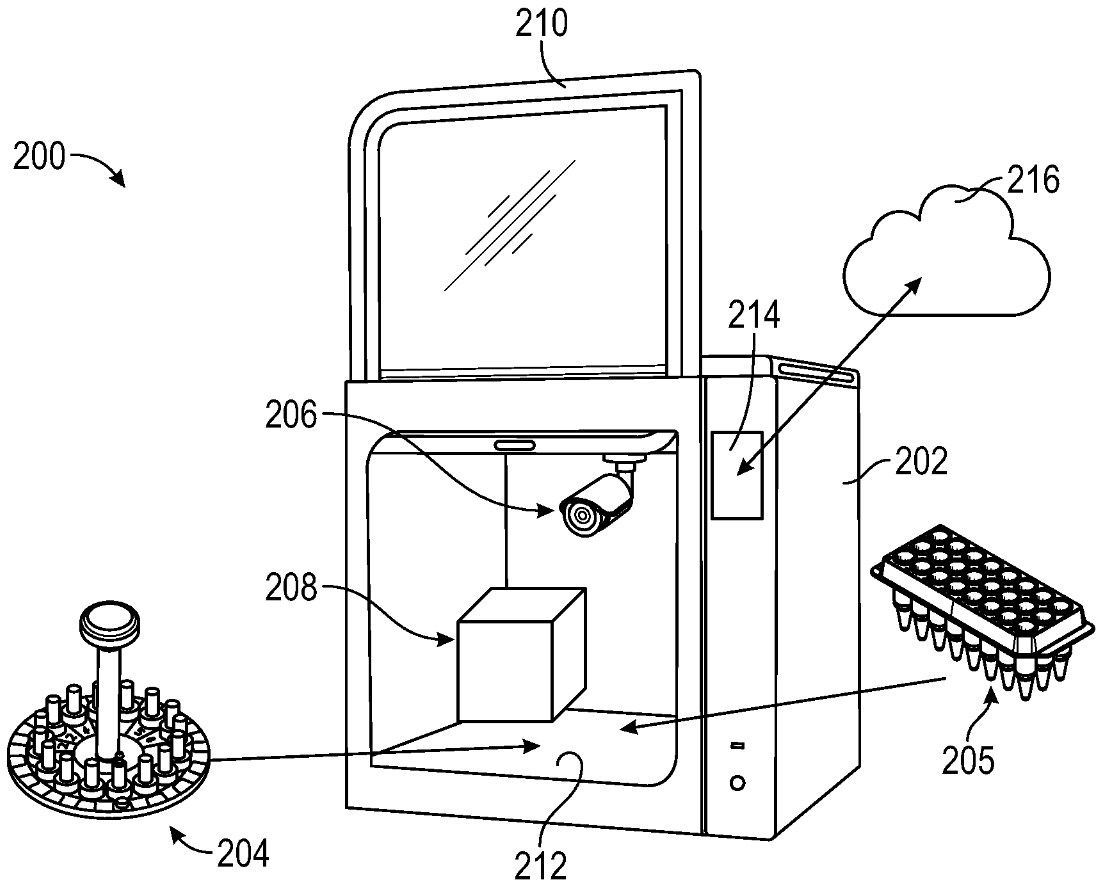
FIG. 2 is perspective view of an exemplary robotic fluid handling system of FIG. 1 comprising a housing, a carousel, a reaction vessel, a thermocycler module and an imaging device located with respect to a deck.

Thermocycler system 107 can be positioned relative to deck 105 and can be configured to receive a liquid vessel, such as reaction vessel 205 (FIG. 2). Liquid vessels can be loaded manually into thermocycler system 107 or via transport device 141. Thermocycler system 107 can be configured to provide a plurality of different heating zones that can heat different portions of reaction vessel 205 to different temperatures. Thus, for example, depending on the amount and type of liquid disposed in reaction vessel 205, different amounts of heating can be applied, such as to perform thermocycling and incubating processes.

Processing system 100 can be provided with an imaging system, e.g., a camera such as imaging device 206 (FIG. 2), to view the presence of items of labware loaded on deck 105 and to read labels of reagent vials loaded onto the items of labware. The imaging system can ensure that all portions of the workspace of deck 105 are in view of at least one camera. The imaging device can be any suitable device for capturing an image of deck 105 and any components on deck 105 or the entirety of structure 140. The imaging device can comprise one of a plurality of imaging devices mounted to or nearby structure 140 to obtain multiple views of labware and reagent vials disposed on deck 105. For example, the imaging device can be any suitable type of camera, such as a photo camera, a video camera, a three-dimensional image camera, an infrared camera, etc. Some embodiments can also include three-dimensional laser scanners, infrared light depth-sensing technology, or other tools for creating a three-dimensional surface map of objects and/or a room. In examples, the imaging device can be used to facilitate function checks, such as by verifying proper location of labware or other components within housing (e.g., housing 202 of FIG. 2) or on deck 105, such as by providing control computer 108 inputs regarding the presence or position of labware or components. In additional examples, fluid levels within any of the containers, vessels, volumes, and the like described herein can be determined via an imaging device such as imaging device 206 or a camera. Such levels can be used with the processes and methods described herein to evaluate the functionality and performance of the fluid handling systems described herein. Optically determined fluid levels can be used as an alternative to the capacitance-based fluid levels described herein. In examples, optical and capacitance fluid levels can be determined and can both be used to perform functions checks and operability checks for redundancy.

Control computer 108 can conduct function check processes of processing system 100, processing apparatus 101, including transport device 141 and liquid dispensers mounted thereto, as well as control the processes run on processing system 100, initially configure the processes, and check whether a component setup has been correctly prepared for a process. Control computer 108 can control and/or transmit messages to processing apparatus 101, transport device 141, and/or thermocycler system 107. Control computer 108 can comprise data processor 108A, non-transitory computer readable medium 108B and data storage 108C coupled to data processor 108A, one or more input devices 108D and one or more output devices 108E. Although control computer 108 is depicted as a single entity in FIG. 1, it is understood that control computer 108 can be present in a distributed system or in a cloud-based environment. Additionally, embodiments allow some or all of control computer 108, processing apparatus 101, transport device 141, and/or thermocycler system 107 to be combined as constituent parts in a single device.

Output device 108E can comprise any suitable device that can output data. Examples of output device 108E can include display screens, video monitors, speakers, audio and visual alarms and data transmission devices. Input device 108D can include any suitable device capable of inputting data into control computer 108. Examples of input devices can include buttons, a keyboard, a mouse, touchscreens, touch pads, microphones, video cameras and sensors (e.g., light sensor, position sensors, speed sensor, proximity sensors). Additionally, input device 108D can comprise a sensor that can receive inputs from transport device 141. In examples, input device 108D can comprise a capacitance sensor (e.g., capacitance sensor 616 of FIG. 7 or capacitance sensor 820 of FIG. 12) that can be in electronic communication with mandrel 254 (FIG. 3) of transport device 141. As such, electrical capacitance sensed at mandrel 254, or a tool loaded therein, can be relayed to, or sensed in conjunction with, the capacitance sensor located in control computer 108. In additional examples, input device 108D can comprise one or more encoders located at transport device 141 to provide location information, such as X, Y, Z coordinates, to control computer 108 regarding the location of mandrel 254 and tools loaded therein relative to the workspace of deck 105.

Data processor 108A can include any suitable data computation device or combination of such devices. An exemplary data processor can comprise one or more microprocessors working together to accomplish a desired function. Data processor 108A can include a CPU that comprises at least one high-speed data processor adequate to execute program components for executing user and/or system-generated requests. The CPU can be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The data processor system can include a means of communicating to external devices such as a USB drive for loading user panels or services such as the Beckman Connect instrument diagnostic service.

Computer readable medium 108B and data storage 108C can be any suitable device or devices that can store electronic data. Examples of memories can comprise one or more memory chips, disk drives, etc. Such memories can operate using any suitable electrical, optical, and/or magnetic mode of operation.

Computer readable medium 108B can comprise code, executable by data processor 108A to perform any suitable method. For example, computer readable medium 108B can comprise code, executable by processor 108A, to cause processing system 100 to perform automated processes, including function check processes, as well as to as well as to control thermocycler system 107, structure 140, transport device 141, and/or processing apparatus 101 to execute the process steps for the one or more processes described herein, particularly those described with reference to FIGS. 8-10 and the Examples section below that describe function check methods.

Computer readable medium 108B can comprise code, executable by data processor 108A, to receive and store process steps for one or more function check procedures (e.g., a procedure for checking functionality of hardware or software of processing system 100). Computer readable medium 108B can include values for the volumetric capacity of various liquid dispensers described herein, as well as tolerance bands for unacceptable or out of calibration operation of the liquid dispensers and slope and offset values for the liquid dispensers that indicate an amount of liquid that is dispensed relative to an actuation parameter, e.g., a piston stroke, a time a pump or motor is activated, a stepper motor movement and the like. Thus, specific volume measurements performed during a function check can be compensated or calibrated for the actual dispensed volume that can shift due to manufacturing variations, fluid properties, set-up particularities and the like.

Computer readable medium 108B can also include code, executable by data processor 108A, for receiving results from processing apparatus 101 (e.g., results from analyzing a biological sample) and for forwarding the results or using the results for additional analysis (e.g., diagnosing a patient).

Additionally, computer readable medium 108B can comprise code, executable by data processor 108A, for obtaining an image of deck 105, identifying information (e.g., the presence of labware) in the images of deck 105, confirming pieces of labware on deck 105 by comparing stored location information in computer readable medium 108B to location information obtained from an imaging process, and adjusting function check processes of processing system 100 accordingly.

Data storage component 108C can be internal or external to control computer 108. Data storage component 108C can include one or more memories including one or more memory chips, disk drives, etc. Data storage component 108C can also include a conventional, fault tolerant, relational, scalable, secure database such as those commercially available from Microsoft SQL, Oracle™ or Sybase™. In some embodiments, data storage 108C can store protocols 108F and images 108G. Data storage component 108C can additionally include instructions for data processor 108A, including protocols. Computer readable medium 108B and data storage component 108C can comprise any suitable storage device, such as non-volatile memory, magnetic memory, flash memory, volatile memory, programmable read-only memory and the like.

Protocols 108F in data storage component 108C can include information about one or more protocols. A protocol can include information about one or more processing steps to complete, components used during the process, a component location layout, loading of thermocycler system 107, heating levels of thermocycler system 107 and/or any other suitable information for completing a process. For example, a protocol can include one or more ordered steps for processing a biological sample or processing a DNA library. A protocol can also include steps for preparing a list of components before starting the process. The components can be mapped to specific locations in the reaction vessel (e.g., reaction vessel 205 of FIG. 2) or in the carousel (e.g., carousel 204 of FIG. 2) or deck (e.g., deck 105) where transport device 141 can obtain the components in order to transport them or the container they are loaded into to processing apparatus 101 or thermocycler system 107. This mapping can be encoded as instructions for operating transport device 141, such as instructions directing a pipettor to aspirate a volume of liquid from a reaction vessel in the carousel and to dispense the volume at a predetermined destination, and the mapping can also be represented by a virtual image shown to a user such that the user can place the components on deck 105, the reaction vessel and the carousel. Embodiments allow processing system 100 to be used for multiple processes (e.g., multiple different sample processes or preparation procedures). Accordingly, information about multiple protocols 108F can be stored and retrieved when needed. Components on deck 105, the reaction vessels and the carousel can be rearranged, changed, and/or replenished as necessary when changing from a first process to a second process within a protocol, or when re-starting a first process within the protocol, or changing from a first protocol to a second protocol. As discussed herein, in order to properly execute protocols, it is desirable for control computer 108 to know how to manipulate transport device 141 to move the working tool to the desired three-dimensional location within the workspace of deck 105.

Images 108G in data storage 108C can include a real-world visual representation of deck 105, the reaction vessels and the carousel, as well as of components disposed on or in deck 105, the reaction vessels and the carousel and labels disposed on those components. In each image, deck 105, the reaction vessels and the carousel can be shown in a ready state for beginning a certain process, with components for executing a protocol placed in locations accessible to transport device 141. Each of images 108G can be associated with a specific protocol from the stored protocols 108F. In some embodiments, there can be a single image for certain protocol. In other embodiments, there can be multiple images (e.g., from different angles, with different lighting levels, or containing acceptable labware substitutions in some locations) for a certain protocol. Images 108G can be stored as various types or formats of image files including JPEG, TIFF, GIF, BMP, PNG, and/or RAW image files, as well as AVI, WMV, MOV, MP4, and/or FL V video files. As such, images 108G can provide information to control computer 108 regarding the presence of labware on deck 105 and proper positioning of such components.

Figure 4:
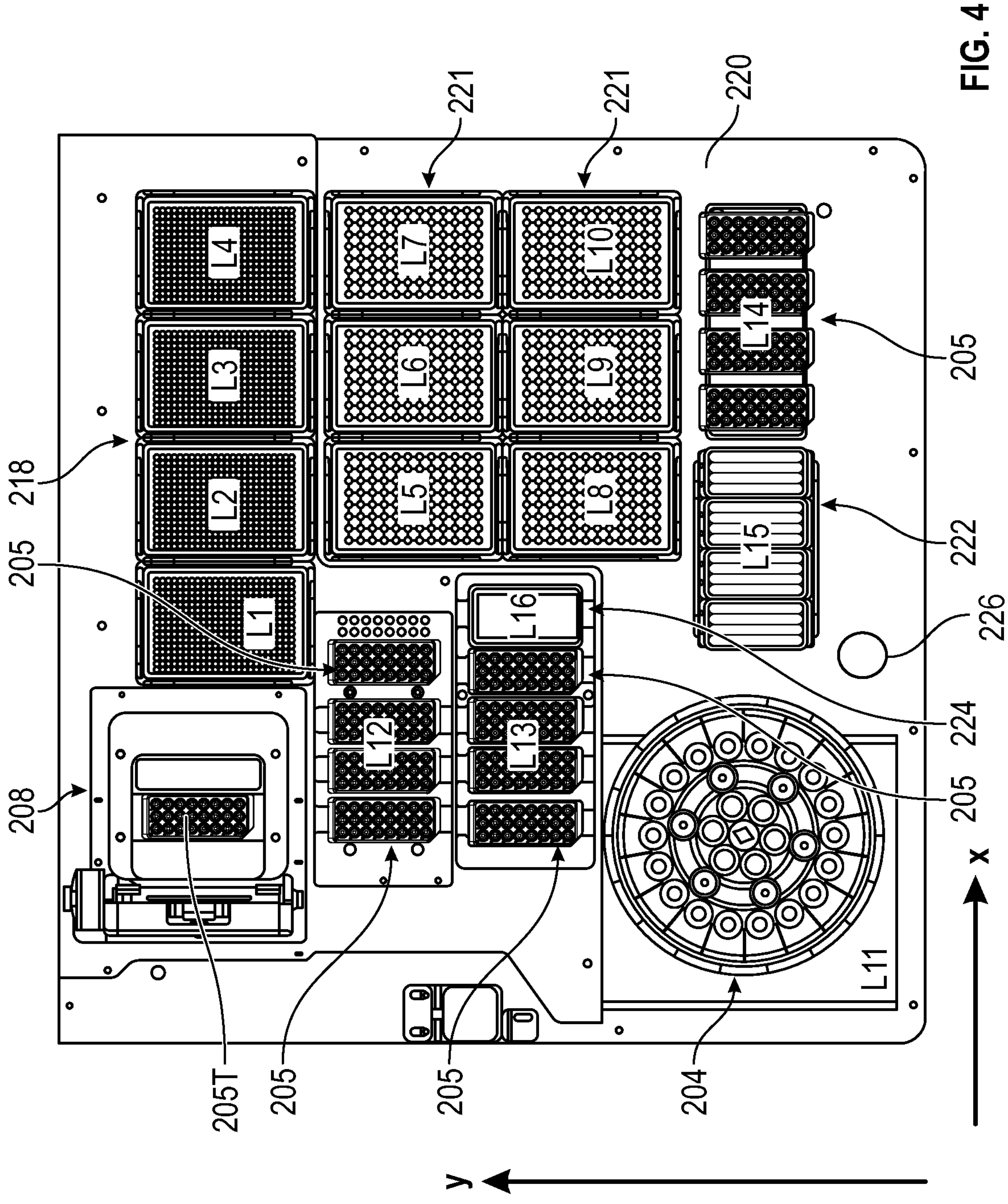
FIG. 4 is a plan view of the deck of FIG. 3 for loading into the housing of FIG. 2 with various items of labware, including reaction vessels, a carousel and a thermocycler reservoir holder, positioned on the deck.

Deck 105 can be subdivided into a plurality of discrete deck locations for staging different components. The discrete locations can be of any suitable size. An example of deck 105 with a plurality of locations is shown loaded with labware in FIG. 4 and unloaded in FIG. 5. Deck 220 in FIG. 4 shows separate areas numbered L1 through L16, as well as thermocycler 208, which can operate as a separate location for separate types of components or packages of components. Deck 105 can have additional locations or fewer locations as desired. While these locations can be numbered or named, they can or cannot be physically labeled or marked on deck 105 in physical embodiments of the system.

Figure 11:
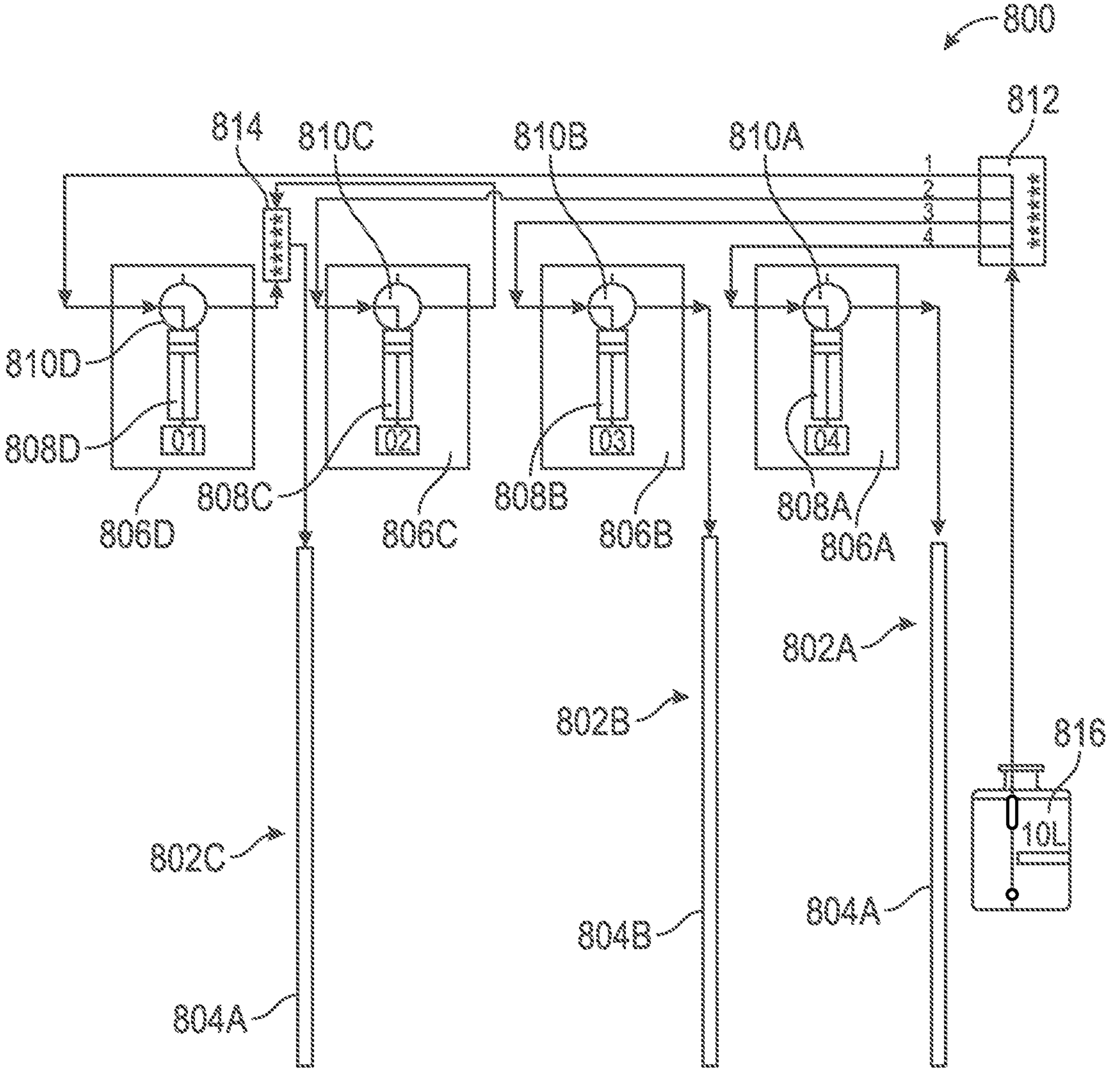
FIG. 11 is a schematic diagram of a fluid handling system comprising a plurality of fixed volume syringes.

As discussed herein, processing system 100 can execute function check procedures for processing system 100 including performing function checks of transport device 141 (FIG. 2), manifold 600 (FIG. 6) and fixed volume syringes 802A-802C of FIG. 11. In particular, processing system 100 can determine 1) the volume of liquid that is transferred from one vessel to another, 2) the volume of liquid that is drawn by a liquid dispenser, and 3) the volume of liquid that is dispensed by a liquid dispenser. The transferred volume, dispensed volume and drawn volume can be compared to the volume that was requested by an operator, a predetermined or set volume stored within the system and/or a reference parameter, such as threshold volumes (e.g., tolerance bands of the predetermined or set volumes), programmed into processing system 100 to determine if components of processing system 100 are functioning and if the liquid dispenser is dispensing the same, or nearly the same, volume that is requested. In other words, a test quantity or target quantity of liquid can be requested to be dispensed by processing system, a quantity of liquid can then be dispensed and measured to determine an actual volume or test volume that was dispensed. A comparison of, e.g., the difference between, the test quantity with the measured test volume can be used to evaluate the functionality and performance of processing system 100. As mentioned, the actual volume of liquid that is drawn by a liquid dispenser and that is transferred from one vessel to another can vary from machine to machine or within the same machine due to mechanical design, liquid properties, tip geometry, manufacturing tolerances, shipping disturbances, final assembly and set-up of processing system 100 at a facility of an end user, disturbances of transport device 141, leaking valves, loose hoses and the like. Thus, even though an operator of processing system 100 can call for an amount of liquid that shall be transferred, such as a desired amount or a predetermined or set amount, the actual amount transferred can vary. If the variations exceed a predetermined threshold, which can be a predetermined volume range or a predetermined calculation of a set of test transfer volumes stored in computer readable medium 108B of processing system 100, the operator can be prompted to perform an inspection or the calibration of the liquid dispenser can be adjusted. As such, the function check procedures described herein can be conducted by processing system 100 without the need of, or with minimal need of, operator intervention and with reduced times as compared to typical procedures.

FIG. 2 is perspective view of fluid handling system 200 that can comprise an example of processing system 100 of FIG. 2. Fluid handling system 200 can comprise housing 202, carousel 204, reaction vessel 205, imaging device 206 and thermocycler system 208. Note, components of FIG. 2 are not necessarily drawn to scale for illustrative purposes. Housing 202 can comprise a plurality of walls or panels that form an enclosure into which carousel 204 and reaction vessel 205 can be positioned. The enclosure can have an opening over which cover panel 210 can be positioned to encapsulate carousel 204, imaging device 206 and thermocycler system 208 within the enclosure. Housing 202 can additionally include platform 212 on which a deck, such as deck 105 (FIG. 1) or deck 220 (FIG. 3) can be positioned. The deck can include various sockets, slots or receptacles (e.g., receptacles 300, 302, 304 and 306 of FIG. 5) for receiving carousel 204, one or more of reaction vessel 205 and the like. In examples, the sockets, slots or receptacles can be configured to hold carousel 204, reaction vessel 205 and the like in predetermined or known positions relative to transport device 141 (FIG. 1, FIG. 3) and imaging device 206. Platform 212 can hold the deck in a predetermined or known position relative to housing 202 and contents therein. Housing 202 can additionally comprise space for holding controller 214, such as those of control computer 108 (FIG. 1). Controller 214 can be configured to communicate with network 216, such as via a wireless or wired communication link.

Imaging device 206 can be located within housing 202 in a stationary location. One or more imaging devices 206 can be configured to point at a single location or multiple locations in housing 202. Simultaneously, dispenser tip 258 (FIG. 3) of transport device 141 and processing apparatus 101 (FIG. 1) can be located within housing 202 to access locations on platform 212. Transport device 141 can additionally be configured to move reaction vessel 205 into thermocycler system 208, as well as other items of labware to any of locations L1-L16 (FIG. 4). Carousel 204 can spin or rotate to present different locations to a fluid dispenser, e.g., dispenser tip 258 (FIG. 3), and imaging device 206. In other examples, a single imaging device 206 can be mounted within housing 202 to move a viewing area over different portions of the interior of housing 202.

Fluid handling system 200 can further comprise transport device 141 (FIG. 1), that can comprise a system for moving a fluid dispenser to different three-dimensional locations within housing 202, as is described with reference to FIGS. 3-5. The function checks described herein can be performed by transport device 141 moving the fluid dispenser within housing 202 to move test quantities of fluid between a source well and a destination well, as is described in greater detail with reference to FIGS. 8-10.

FIG. 3 a schematic diagram illustrating platform 212 of FIGS. 4 and 5 with labware piece 230 positioned within receptacle 232 of deck 220 and positioned relative to transport device 141 and imaging device 206. Transport device 141 can comprise an overhead crane system having rails 240A and 240B that run across a length of platform 212 and bridge 242 that can span the width of platform 212. Bridge 242 can be configured to slide on rails 240A and 240B, such as via wheels 244A and 244B. Carriage 246 can be coupled to bridge 242 and can be configured to move along bridge 242 across the width of platform 212. Bridge 242 and carriage 246 can be operatively coupled to one or more motors 248 and power sources (not shown), as well as control panel 214 (FIG. 2) or control computer 108 (FIG. 1), to move according to a function check procedure or protocol. Carriage 246 can comprise trolly 250 having wheels 252A and 252B, mandrel 254 and tip socket 256. Mandrel 254 can be coupled to one or more instruments for performing a function check procedure or protocol. In the illustrated example, tip socket 256 is coupled to dispenser tip 258. In examples, dispenser tip 258 can be configured to move axially in the Z direction via telescoping action of mandrel 254, carriage 246 can be configured to move axially in the X direction on bridge 242, and bridge 242 can be configured to move axially in the Y direction on rails 240A and 240B. As such, dispenser tip 258 can be moved to engage receptacle 232 and labware piece 230 and move liquid to and from labware piece 230 from other locations on deck 220. Motor 248 can comprise one or more motors for moving trolly 250 by activating wheels 252A and 252B, moving bridge 242 by activating wheels 244A and 244B, and moving tip socket 256 relative to mandrel 254, such as by moving a linear actuator. Motor 248 can comprise a stepper motor wherein the position of a component of motor 248 relative to the rest of motor 248 can be translated into an X, Y, or Z position in the coordinate system.

According to the present disclosure, transport device 141 can be operated by controller 214 to engage a tip of dispenser tip 258 or tip socket 256 of mandrel 254 if dispenser tip 258 is not installed in tip socket 256 to engage liquid within a container or volume of fluid to sense a level of fluid, such as to execute function check procedures described herein. Mandrel 254, tip socket 256 extending therefrom, and dispenser tip 258, as well as other conducting or semi-conducting instruments attached to tip socket 256, can be configured to be in electrical communication with a capacitance sensor located, for example, in controller 214 (FIG. 2), carriage 250, mandrel 254, or another location in or on housing 202. In an example, mandrel 254 and the associated capacitance sensor can be configured as mandrel 606 and capacitance sensor 616 of FIGS. 6 and 7 or housings 822A-822D of FIGS. 11 and 12. In examples, the capacitance sensor can comprise a CapSense R sensor from Cypress Semiconductor. In additional examples, pipettes attached to tip socket 256 can be fabricated from plastic infused or embedded with conducting material. Thus, processing system 100 can utilize a conductive tip to sense a magnitude of a capacitance between the tip and the container of conductive fluid is measured. This magnitude can be correlated to data stored in memory available to processing system 100 to determine a level of the liquid surface. Examples of capacitance sensing circuits are described in U.S. Pat. No. 4,912,976, titled "Liquid level sensing apparatus" to inventor Labiola, II, U.S. Pat. No. 4,736,638, titled "Liquid level sensor" to inventors Okawa et al., and U.S. Pat. No. 7,275,430, titled "Method and apparatus for detecting liquid levels in liquid-storage containers" to Zuleta et al., each of which are incorporated herein in their entirety by this reference.

As is discussed in greater detail below with reference to FIGS. 8-10, controller 214 (FIG. 2) can be configured to execute function check or performance check procedures for a fluid dispenser coupled to trolly 250 to verify if the fluid dispenser is receiving, filling with and dispensing a volume (e.g., quantity) of fluid commensurate with a volume of fluid called for by an operator. As discussed herein, controller 214 can be configured to operate transport device 141 to contact liquid within vessels or labware loaded onto platform 212 or a vessel or bore fabricated into a module on deck 220. Contact of a liquid level sensor connected to or mounted on transport device 141 can be used to sense a level of the liquid within the vessel or labware. For example, mandrel 254 or dispenser tip 258 can be provided with a liquid level sensor such as a capacitance sensor. The level information read from these sensors can be connected to control computer 108 (FIG. 1) to be compared to information, such as information obtained from network 216 (FIG. 2) or stored in a computer readable medium, such as medium 108B of FIG. 1 or provided by the operating method. The information stored in the computer readable medium can include volume information for a library of labware and containers that corresponds to liquid levels in those items of labware and containers. For example, complete geometric information (e.g., dimensions, sizes, tolerances, etc.) for pieces of labware that can be positioned within each of receptacles 300, 302, 304 and 306 can be stored in medium 108B of FIG. 1 or be made available via network 216 (FIG. 2). This information can comprise slope and offset values relating to the volume of liquid stored in the items of labware and containers at levels of liquid in those items can be stored, e.g., a level-to-volume conversion factor. As such, the internal well geometry of specific items of labware useable for the function checks described herein can be used to correlate sensed liquid height level to volume.

The stored information can also comprise reference volume information used to test functionality of liquid dispensers as well as associated threshold ranges for said reference volumes. For example, slope and offset information corresponding to an amount of fluid dispensed relative to an actuation parameter for said fluid dispenser, e.g., a piston stroke, a time a pump or motor is activated, a stepper motor movement and the like. As such, the fluid dispenser dispensing information useable for the function checks described herein can be used to correlate sensed liquid levels to transferred volume.

Controller 214 (FIG. 2) can be configured to categorize different function checks. For example, controller 214 can categorize function check results into hard fails and soft fails. A hard fail can comprise results of a function check that are indicative of fluid handling system 200 not functioning properly or being incapable of producing accurate fluid dispensing. A hard fail can be indicative of hardware failures, such as pump malfunctioning, or hardware errors such as loose hoses or tubes, that can be corrected with the assistance of operator interaction. A soft fail can comprise results of a function check that are indicative of fluid handling system 200 partially functioning and being in a state where adjustment is beneficial. A soft fail can be indicative of a software failure, such as a fluid dispenser being out of calibration, that can be auto-corrected by fluid handling system 200.

The function checks disclosed herein can be performed at low-volume and high-volume settings. A low-volume setting can, for example, be configured to dispense a reference volume of 5 micro-liters (μl) and a threshold range for acceptable volume can be +/−3 μl for a hard fail and +/−0.25 μl for a soft fail. A high-volume setting can, for example, be configured to dispense a reference volume of 20 micro-liters (μl) and a threshold range for acceptable volume can be +/−10 μl for a hard fail and +/−1 μl for a soft fail. Likewise, initial reference volumes can be dispensed into the reference containers to, for example, take out deviation in the cross-section of the reference volume such as rounded bottoms. The initial reference volume can be 40 μl for a low-volume check and 200 μl for a high-volume check. However, other ranges can be used. As such, controller 214 can compare the expected dispensed volume with the measured dispensed volume to determine if the fluid handling system is functioning properly, as is discussed below with reference to FIGS. 8-10.

Inherent structural features of receptacle 232 that are fixedly attached to deck 220 can be contacted and the location of tip socket 256 in three-dimensional X, Y, Z coordinates can be recorded so that controller 214 can know the location of receptacle 232 and labware piece 230 located therein. Likewise, the well geometry within labware piece 230 can be known to controller 214 such that the location at which the capacitance probe contacts a level of liquid within the well of labware piece 230, the geometry of the well can be used to calculate or determine the volume of liquid in labware piece 230 for any given sensed level.

FIG. 4 is plan view of deck 220 for loading onto platform 212 of housing 202 of FIG. 2 with labware loaded thereon. FIG. 5 is a plan view of deck 220 of FIG. 3 without the labware loaded thereon. Unless specifically noted otherwise, FIGS. 4 and 5 are discussed concurrently.

Deck 220 can include spaces or locations L1-L16 for various components, including carousel 204, reaction vessels 205, pipette tip racks 218, milli-tip racks 221, bulk reservoirs 222 and waste bin 224. Other locations can be provided for other items of labware, such as tube holders and reagent tube holders. Deck 220 can further comprise cup 226, which can comprise a container having an internal well geometry that is both fixed in size and location relative to deck 220, with the size and location being stored in computer readable medium 108B. Cup 226 can comprise a destination well for performing the function checks described herein. In examples, deck 220 can include a plurality of cups 226 having different sizes or aspect rations for performing different volume checks, such as one for low-volume checks and one-for high volume checks. Deck 220 can also be configured to represent the embodiment of a plurality of modules that with predefined and fixed operational locations. Where these modules may comprise complete subsystems that perform dedicated functions. For example, a module may perform specimen or prepared sample washing while another may present primary specimens to the liquid handler 141 for specimen aliquot.

One or more imaging devices 206 can be mounted within housing 202 relative to platform 212 such that imaging device can produce a field of view that covers all of platform 212. Likewise, a transport system, such as transport device 141 of FIGS. 1 and 3, can be configured to move mandrel 254 around the entirety of platform 212.

FIG. 4 shows deck 220 including locations numbered L1-L16, as well as other components such as thermocycler system 208, which can operate as a separate location for separate types of components or packages of components. Examples of deck 220 can have additional locations or fewer locations, as desired. While these locations can be numbered or named, the locations may or may not be physically labeled or marked on deck 220 in physical embodiments of fluid handling system 200. In examples of fluid handling system 200, some or all of the locations can be occupied by a pre-defined type of component according to a certain protocol. For example, locations L1-L4 can comprise storage locations for pipette tip racks 218 and location L5-L10 can comprise storage locations for milli-tip racks 221 that can be loaded with a component of a package or reagent kit or a component as specified by a protocol, and location L11 can be loaded with carousel 204. Racks 218 and 221 can comprise instances of reaction vessel 205. Location L12 can comprise a cold reagent storage area for reaction vessels 205. Location L13 can comprise a warm reagent storage area for reaction vessels 205. Location L14 can comprise a storage area for bulk reservoirs 222. Location L15 can comprise an RV stack storage area for reaction vessels 205. Locations L14 and L15 can be interchanged. Location L16 can comprise a waste storage area for bin 224. Some of locations L1-L16 can include the same type of component. The components can comprise test tubes, microwell or microtiter plates, pipette tips, plate-lids, reservoirs or any other suitable labware component. The components can also comprise an item of laboratory equipment, such as a shaker, stirrer, mixer, temperature-incubator, vacuum manifold, magnetic plate, thermocycler, or the like.

One or more of locations L1-L 16 can be programmed to processing system 100 to be the location for receiving a piece of labware of a known geometry for performing volume calculations based on liquid levels sensed. That is, processing system 100 can be provided with the X, Y, Z coordinates of locations L1-L16 and the internal well geometry of labware configured to be stored in locations L1-L16. Thus, processing system 100 can be configured to know the three-dimensional position of the internal well geometry of specific pieces of labware relative to deck 220 such that the position of a liquid level sensed within each internal well geometry can be translated to a volume, e.g., a partial volume of the total internal well geometry.

In examples, one or more containers or internal well geometries can be physically part of structure 140 (FIG. 1), housing 202 (FIG. 2) or deck 220 (FIG. 3), or can be a separate component disposed on (and affixed to) platform 212. In an example, deck 22 can include cup 226, which can comprise a bore or recess that can define a fixed and defined geometry in the three-dimensional X, Y, Z space of processing system 100. As such, the location of such fixed well geometry need not be correlated to the presence and location of a piece of labware or other container on deck 220 at one of locations L1-L16. Cup 226 can have a high aspect ratio, e.g., a narrow cross-section and a tall height such that a small volume of fluid added to cup 226 can generate a large change in fluid height.

Each of locations L1-L16 can be accessed by transport device 141 (FIG. 1). For example, locations L1-L16, and thermocycler 208 can be physically separate from structure 140 or deck 220. As shown in FIG. 5, locations L1-L16 can comprise, sockets, slots or receptacles into which other components, e.g., labware, can be positioned and held stationary in known locations relative to transport device 141.

For example, bulk reservoirs 222 (FIG. 3) can be positioned in bulk reservoir holder 300 (FIG. 5), reaction vessel 205 (FIG. 3) can be positioned in labware holder 302 (FIG. 5), milli-tip racks 221 (FIG. 4) can be positioned in rack holder 304 (FIG. 5) and thermocycler reservoir 205T (FIG. 4) can be positioned in thermocycler reservoir holder 306 (FIG. 5).

Imaging device 206 can be configured to recognize the presence of one or more components at each of locations L1-L16 the presence of carousel 204 at location L11 and the presence of reaction vessel 205 at locations L12, L13 and L14, for example. Components, e.g., vials of liquid, can be loaded into carousel 204 is a desired manner, e.g., according to a protocol and liquid therefrom, or another location, can be loaded into one of reaction vessels 205 for loading into thermocycler system 208 according to the protocol. Imaging device 206 can be used to identify a component loaded onto deck 220 and verify that the identified component is the expected component. In further examples, imaging device 206 can indicate that a component other than the expected component has been loaded, or that the expected component has been loaded improperly (such as crooked). In examples, the function check process can be used to confirm the presence, shape and proper loading of the component. For example, if the function checks described herein determine a hard fail, imaging device 206 can be used to evaluate proper or improper positioning of a piece of labware or another component of fluid handling system 200.

Figure 6:
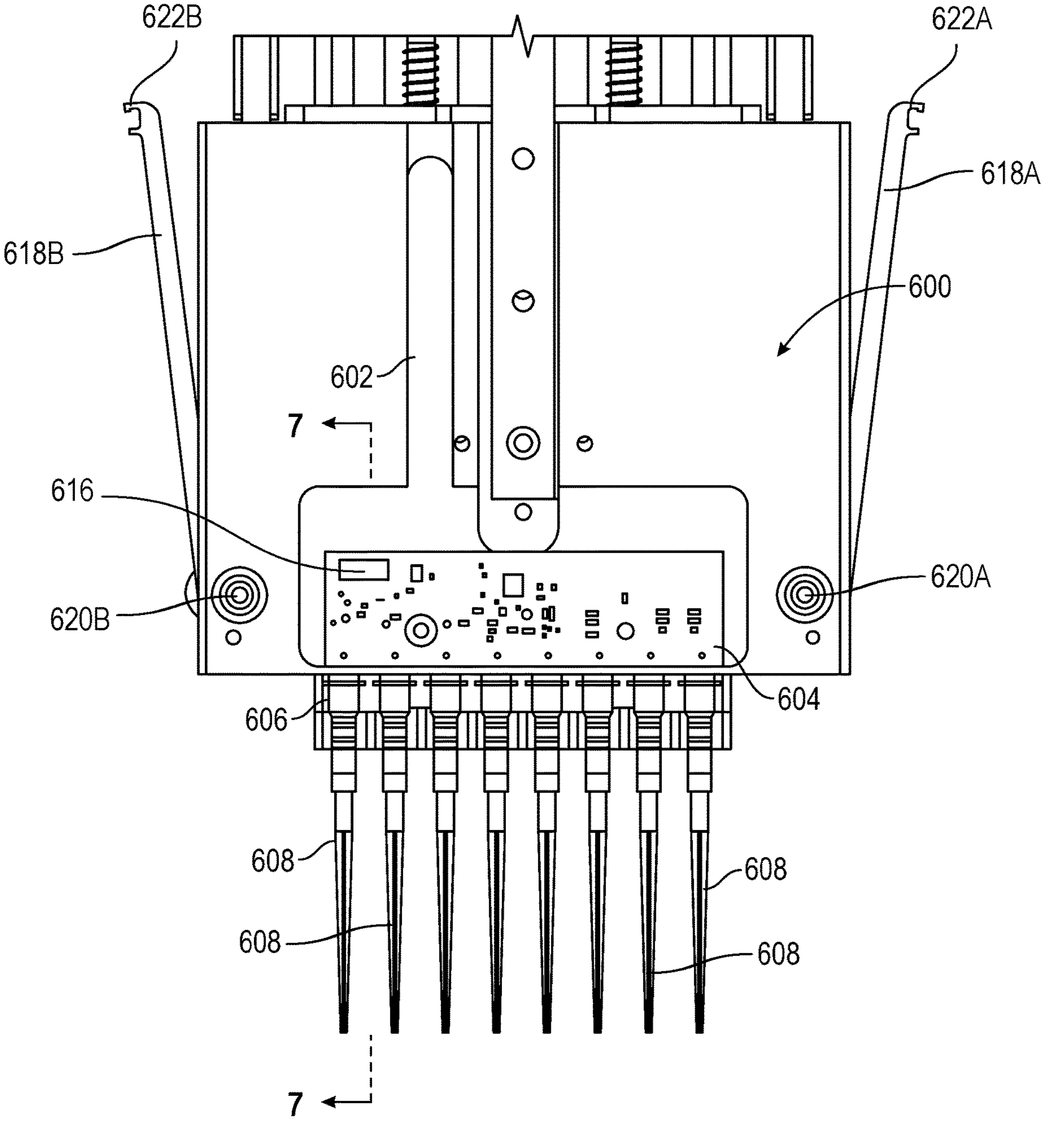
FIG. 6 is a perspective view of a manifold that can be coupled to a transport device of a fluid handling system of the present disclosure.

FIG. 6 is a perspective view of manifold 600 that can be coupled to transport device 141. In examples, manifold 600 can be connected to carriage 250 (FIG. 3) to be mobile within the workspace of fluid handling system 200 (FIG. 2). Manifold 600 can include various cables and connectors for electronically coupling manifold and components thereof to controller 214. For example, manifold 600 can comprise cable 602 that can connect circuit board 604 to controller 214. Mandrel 606 can be connected to manifold 600, which can include spaces to couple to multiple pipette tips 608. In the illustrated example, manifold 600 can hold 8 pipette tips 608.

Figure 7:
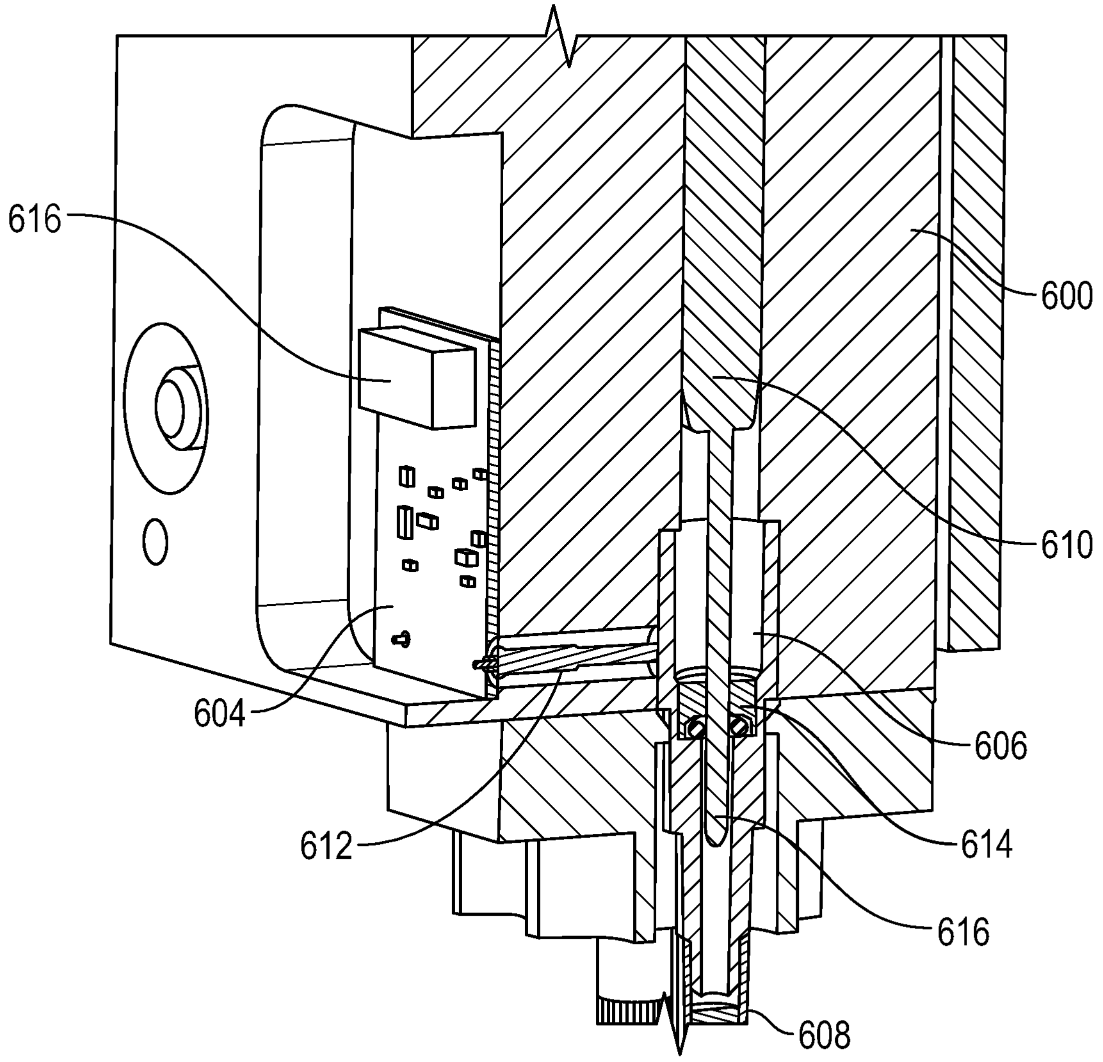
FIG. 7 is a cross-sectional view of the manifold of FIG. 6 taken at section 7-7 showing a circuit board, a mandrel, a pipette tip, a plunger and a connector pin.
Figure 12:
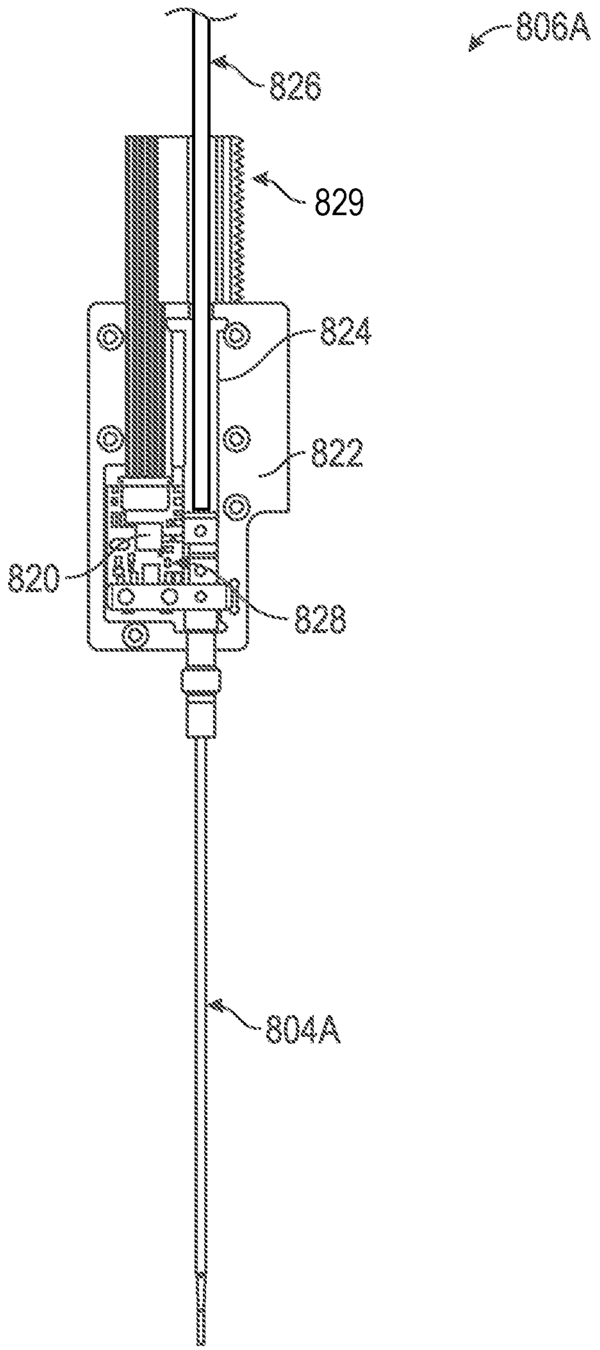
FIG. 12 is a diagram illustrating one of the fixed volume syringes of FIG. 11 coupled with a capacitance sensor.

FIG. 7 is a cross-sectional view of manifold 600 of FIG. 6 taken at section 6-6 showing circuit board 604, mandrel 606, pipette tip 608, plunger 610 and connector pin 612. FIGS. 11 and 12 are discussed concurrently.

Mandrel 606 can comprise a device to which pipette tips 608 can be connected. In examples, mandrel 254 of FIG. 3 can be configured similarly to mandrel 606. Mandrel 606 can include sealed cap 614 through which shaft 616 of plunger 610 can be extended. Plunger 610 can be activated by manifold 600, such as via controller 214, to draw a vacuum within pipette tip 608, similar to a syringe. Each pipette tip 608 can include a shaft 616, and each of shaft 616 can be connected to plunger 610 so that all of pipette tips 608 can be actuated at the same time whether or not they are each actually performing a function. As such, transport device 141 can move mandrel 606 around the workspace to that pipette tips 608 can be inserted into a volume of liquid, plunger 610 can be retracted (moved upward with reference to FIG. 7) to draw liquid into pipette tip 608 and moved to another position to dispense the liquid by downward movement of plunger 610.

Circuit board 604 can comprise a liquid level sensor board that is configured to sense capacitance. As such circuit board 604 can comprise capacitance sensor 616 that can be in electronic communication with connector pin 612. Connector pin 612 can provide an electrical connection between mandrel 606 and pipette tip 608 coupled thereto. In an example, connector pin 612 can comprise a pogo pin. For example, capacitance sensor 616 can be used to sense the level of liquid within a vial or container into which a pipette tip is inserted into, as can be appreciated by one of skill in the art. Furthermore, capacitance sensor 616 can be used to sense the position of mandrel 606 when contacted to a conducting surface. Additionally, if a conductive pipette tip 608 is coupled to mandrel 606, capacitance sensing can be conducted using pipette tips 608.

As can be seen in FIG. 7, manifold 600 can further comprise gripper arms 618A and 618B, which can be coupled to manifold 600 at pivot points 620A and 620B, respectively. Gripper arms 618A and 618B can include gripping features 622A and 622B, respectively, such as teeth, flanges or fingers that can couple to an item of labware. For example, gripping features 622A and 622B can latch onto an edge of an item of labware so that transport device 141 can be used to move the item of labware around the workspace. Gripper arms 618A and 618B can be electronically coupled to capacitance sensor 616.

Incorporating capacitance sensor 616 into manifold 600 to be in electric communication with mandrel 606 can allow for configurations that facilitate execution of various features described herein, including function check processes.

As shown above in FIGS. 6 and 7, some embodiments of the present disclosure can include a manifold, pipettor or liquid dispenser that includes multiple channels. Each of these liquid-conducting channels can be coupled to a different capacitance sensor, e.g., a separate instance of capacitance sensor 616, to allow independent checking or calibration of each channel. For example, each of pipette tips 608 shown in FIG. 6 can be electronically coupled to an instance of capacitance sensor 616 to allow for independent function check operations to be conducted with each pipette tip 608.

Figure 8:
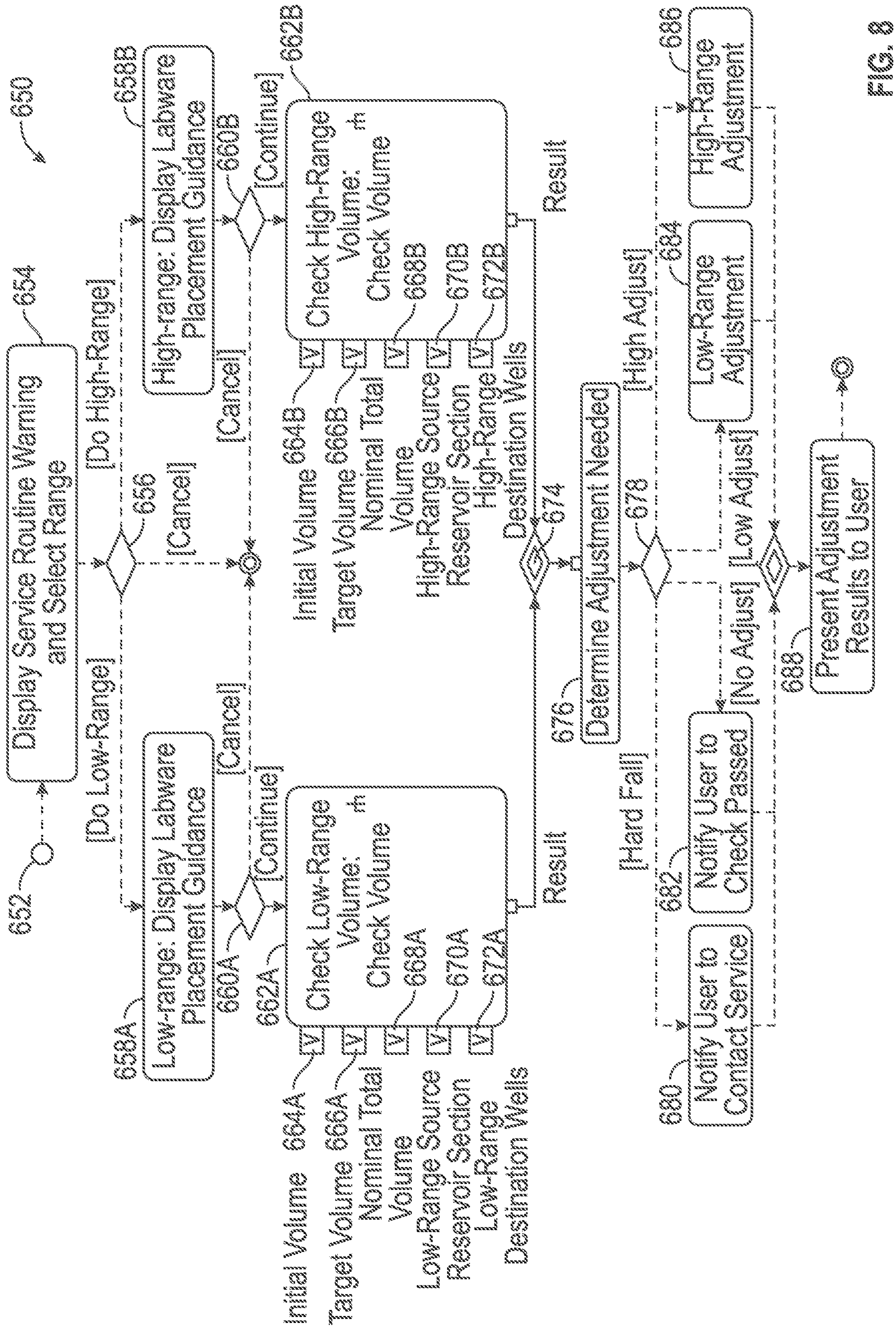
FIG. 8 is a line diagram illustrating steps for performing function checks of the robotic fluid handling system of FIGS. 1-7.

FIG. 8 is a line diagram illustrating method 650 for performing function checks or performance checks of the robotic fluid handling systems of FIGS. 1-7 and 11-12, including processing system 100, fluid handling system 200, and fluid handling system 800. FIG. 8 is described primarily with reference to processing system 100 and fluid handling system 200, but applies equally to fluid handling system 800. Reference is made to fluid handling system 800 intermittently.

At step 652, a user can activate fluid handling system 200 (FIGS. 2 and 3). For example, a user can toggle a power button or switch to enable or power a user interface, such as a touch screen display and the like. Power can be initiated at input device 108D (FIG. 1) or controller 214 (FIG. 2). The user interface can be used to selectively actuate the functions check described herein by user interaction. Additionally, the function checks described herein can be initiated automatically, such as by controller 214 of fluid handling system 200. In either circumstance, the function checks can be run automatically by fluid handling system 200 once initiated. That is, all or most of steps 654-688 can be automated by fluid handling system 200 without interaction from the user.

At step 654, the user interface, such as at output device 108E (FIG. 1) can display a graphical or textual warning to the user. The warning can indicate to the user that a service routine will be conducted before further operation of fluid handling system 200 is permitted or enabled. For example, the user can be warned that one or more function checks of fluid handling system 200 is being performed, such as a calibration check of one or more fluid dispensers, such as pipette tips 608 (FIG. 6). The warning can additionally include indicia that fluid handling system 200 is temporarily disabled along with a timer or indicator to show progress of the function checks.

At step 656, the user can be prompted to select between calibrating low-range fluid dispensers or high-range fluid dispensers of fluid handling system 200. Many fluid handling systems can be configured to dispense a large volume that uses all or most of the capacity of the fluid dispenser or a combination of fluid dispensers, or a small volume that uses only a portion of the capacity of the fluid dispenser or a single fluid dispenser. The margin of error, e.g., the threshold range at which the fluid dispenser will be considered out of calibration, for each volume can be different. For example, an error for high-range dispensing may be inconsequential to the high-range volume, but may be a significant portion of the low-range volume. As such, fluid handling system 200 can perform functions checks for different volume dispensing settings. Fluid handling system 200 can automatically perform both low-and high-range function checks, or a user can enter into the user interface a desired one of the volume ranges to check.

At step 658A, the user can select the low-range dispensing option. At step 660A, a user can cancel the selection to return to step 656.

At step 658B, the user can select the high-range dispensing option. At step 660B, a user can cancel the selection to return to step 656.

Input device 108D (FIG. 1) or controller 214 (FIG. 2) can be used to select the low-range and high-range settings and the cancel options. After selection of the low-range or high-range option, the user can be prompted, such as at output device 108E (FIG. 1) to load the appropriate labware and pipette tips into fluid handling system 200 and ensure that a source volume of liquid is adequately supplied. Graphical instructions can be provided for selecting and placing appropriate labware for each function check. The operator can also be instructed to ensure that any doors to enclosure 202 (FIG. 2) are properly closed.

At step 662A, fluid handling system 200 can perform a function check to determine a volume of liquid that a fluid dispenser is configured to transport for a low-range operation. Step 662A can include various inputs 664A-672A to determine a volume of fluid that one or more of the fluid dispensers of fluid handling system 200 is actually dispensing.

Input 664A can comprise an initial volume, or initial quantity, of fluid dispensed into a reservoir specifically selected at input 672A. The initial volume can be used to provide an initial liquid level within the selected reservoir to allow a baseline liquid level to be sensed. The initial volume can additionally remove any interior non-uniformities in the shape of the selected reservoir. In examples, the initial volume can be 40 micro-liters (μl) for the low range check.

Input 666A can comprise a target volume, or target quantity, that will be used to determine the dispensed volume. The target volume can be large enough to allow sufficient liquid level changes to occur that can be readily distinguished from each other, e.g., the addition of a target volume produces a perceptible or measurable level change. The target volume can also be large enough to facilitate large enough volume transfers to occur to generate test data relating to dispensed volumes. However, the target volume can also be small so as to allow multiple target volumes to be dispensed in a single selected reservoir. In examples, the target volume can be 5 micro-liters (μl) for the low-range check.

Input 668A can comprise a nominal total volume or nominal total quantity. The nominal total volume can be the total volume dispensed in a number of discrete target volumes. In other words, the total number of target volumes to be dispensed to complete the test will equal the nominal total volume. In examples, the nominal total volume can be 100 micro-liters (μl) such that twenty target volumes will be dispensed into the selected reservoir. The nominal total volume can be selected so that a set of target volume measurements can be made upon which to perform a statistical analysis.

Input 670A can comprise a source selection location where a reference fluid for use in the function checks described herein is located. The source selection can be a location on deck 220 (FIG. 3) where a piece of labware is located that can hold test fluid. The piece of labware and the test fluid can be loaded by a user of fluid handling system 200. The source selection can also comprise a container of fluid located outside of fluid handling system 200 connected to carriage 246 via a tube or hose, such as source volume container 816 (FIG. 11). The source selection comprises fluid used to perform the initial volume dispensation and the subsequent target volume dispensations. Input 670A can inform fluid handling system 200 where to obtain fluid to perform the function checks described herein. In examples, the test fluid can comprise deionized water, a saline solution, or another suitable fluid or liquid. In examples, conductive liquid can be used as the test fluid.

Input 672A can comprise a low-range destination well or reference container selection for the selected reservoir for use with inputs 664A-668A. The destination well selection can comprise a piece of labware having a specific geometry for which the function check calculations described herein can be computed. In examples, the selected reservoir can be a deep-well, 384-well plate having a slope of 0.07755 mm/μl and an offset of 1.02995 mm. The slope represents a ratio of a height of liquid in the selected reservoir for specific volume of fluid in the selected reservoir. The offset represents a height of liquid in the reservoir to compensate for edge effects and the geometry of the bottom of the selected reservoir. The destination well can also comprise cup 226 (FIGS. 4 and 5) or another fixed well on or in deck 220.

At step 662B, fluid handling system 200 can perform a function check to determine a volume of liquid that a fluid dispenser is configured to transport for a high-range operation. Step 662BA can include various inputs 664B-672B to determine a volume of fluid that one or more of the fluid dispensers of fluid handling system 200 is actually dispensing. Inputs 664B-672B can function similarly as inputs 664A-672A, but with different particular values for the initial volume, target volume, slope and offset. For the high-range volume check, the high-range destination well can comprise a deep-well, 96-well microplate with a slope of 0.0293122 mm/μl and an offset of 3.2216961 mm, the initial volume can be 200 μl, the target volume can be 20 μl, and the nominal total can be 1,000 μl.

Figure 9:
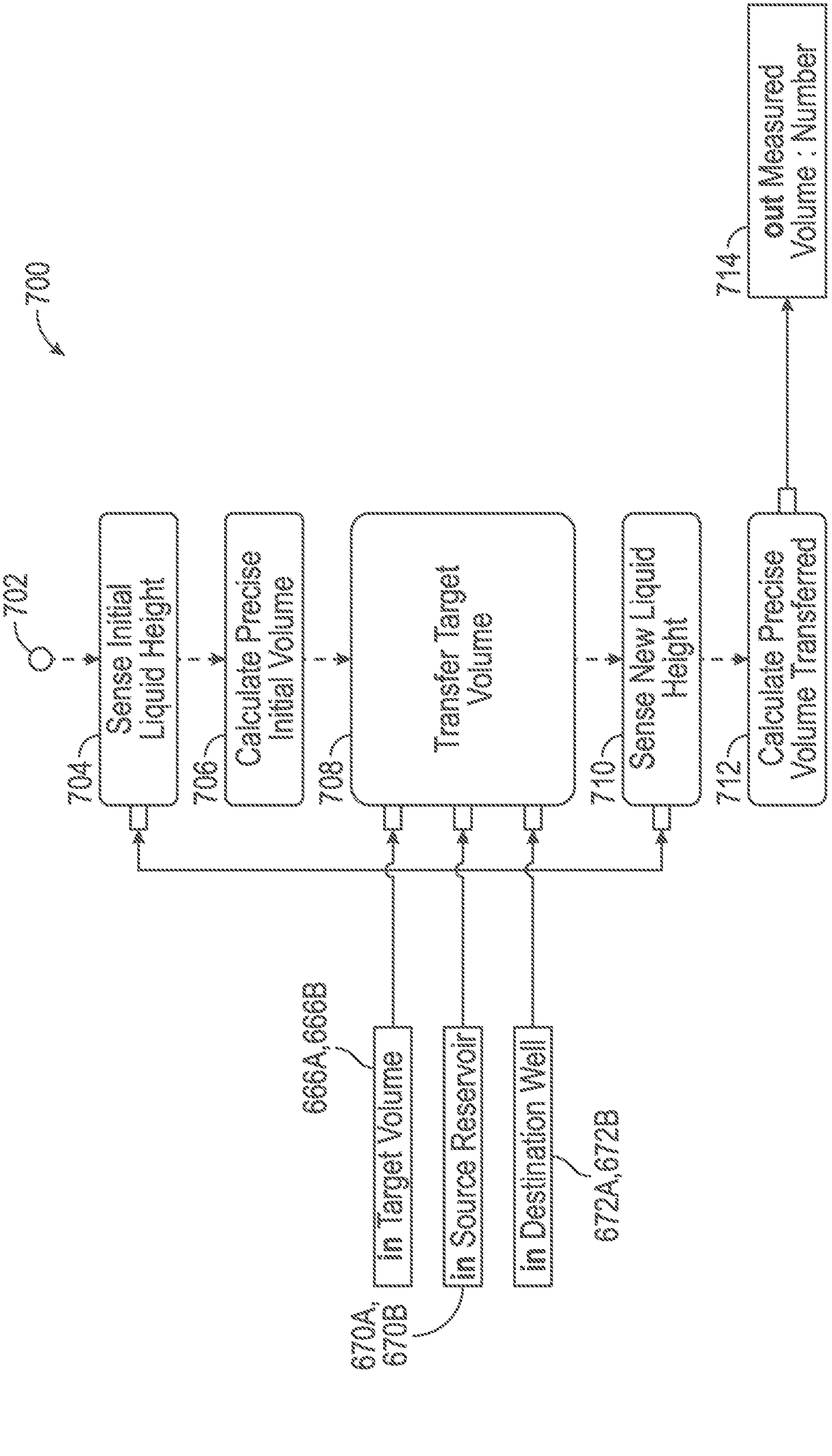
FIG. 9 is a line diagram illustrating steps for measuring fluid transferred with a pipette tip of the manifold of FIGS. 6 and 7.

At step 674, the output of steps 672A and 672B can be determined using, for example, the process of FIG. 9 or other procedures described herein. The output of steps 672A and 672B can be stored in memory, such as computer readable medium 108B (FIG. 1). The output can comprise whether or not the calculated volumes fall within various soft fail and hard fail thresholds, as well as the raw data and calculations preformed on the raw data. Additionally, the output can comprise a plurality of iterations of steps 662A and 662B such that a set of data can be generated and stored.

At step 676, adjustments for the fluid dispensing devices of fluid handling system 200 can be determined. The output of step 674 can be compared to baseline or threshold data stored in memory, such as computer readable medium 108B (FIG. 1). For example, the baseline or threshold data can comprise definitions for hard fails and soft fails that the output of step 674 can be compared to in order to determine what actions are desired next in step 678.

At step 678, fluid handling system 200 can determine to notify the user to contact service at step 680, notify the user that fluid handling system 200 passed the functions check at step 682, perform a low-range adjustment of the fluid dispensers at step 684, and perform a high-range adjustment of the fluid dispensers at step 686.

At step 680, fluid handling system 100 can determine that one or more functions of fluid handling system 100 is not properly functioning. Such improper functioning can be at a level where fluid handling system 100 cannot self-correct. Thus, fluid handling system 100 can display, such as on output device 108E (FIG. 1), an indication to the user that service should be called or performed. In such cases, fluid handling system 100 can disable itself from functioning to dispense fluid or perform protocols, only allowing the function checks to be repeated. Thus, the user can check components of fluid handling system 100 for maintenance, such as loose hoses, loose fasteners, leaks or other visible or tangible sources of potential inoperability. In other circumstances, a user may not be able to find, identify or correct the inoperability of fluid handling system 100 and the user can be prompted to call a technician to inspect and reset fluid handling system 100. In examples, imaging device 206 (FIG. 2) can be used view or verify improperly positioned labware or deficiencies in fluid handling system 100.

At step 682, fluid handling system 100 can determine that one or more functions of fluid handling system 100 are properly working and that no corrective actions are needed. Fluid handling system 100 can display, such as on output device 108E (FIG. 1), that fluid handling system 100 passed all function checks and that fluid handling system 100 is being placed in an operating mode to dispense fluid or perform protocols. Fluid handling system 200 can be operated to, for example, conduct library construction processes described herein.

At step 684, fluid handling system 100 can perform low-range adjustments of the fluid dispensers. Step 684 can additionally inform the user that corrective action is being taken via output device 108E (FIG. 1). Adjustment of the fluid dispensers can be performed using, for example, an iterative process of dispensing fluid, measuring fluids to determine volumes, adjusting the slope of the fluid dispenser (μl requested/μl dispensed) by adjusting an actuation parameter for said fluid dispenser, e.g., a piston stroke, a time a pump or motor is activated, a stepper motor movement and the like, and repeating the process until the actual fluid dispensed for the fluid dispenser is within a tolerance band of being acceptable. Furthermore, fluid dispenser adjustment can dispense fluid at different target volumes to test the accuracy of the fluid dispenser. For example, fluid can be dispensed at 20 μl, 60 μl and 100 μl to verify the accuracy of the fluid dispenser at different volumes. Thus, for example, if a user calls for a volume of 100 μl to be dispensed, but test measurements indicate that only 98 μl are being dispensed, control computer 108 can adjust the fluid dispenser to act as if it were going to dispense 102 μl. Such an offset can be computed over a range of volumes so that the slope of the fluid dispenser is adjusted accordingly.

At step 686, fluid handling system 100 can perform high-range adjustments of the fluid dispensers. Step 684 can additionally inform the user that corrective action is being taken via output device 108E (FIG. 1). The high-range adjustment can be similar to what is described with respect to the low-range adjustment, but with larger dispensed volumes.

At step 688, results of method 650 can be reported to the user, such as at output device 108E (FIG. 1). Step 688 can also include informing the user that fluid handling system 200 is being placed into an operation mode for user operation or that fluid handling system 200 has been disabled until further action is taken, such as after a certified technician has inspected and corrected any issues with fluid handling system 200. Results of method 650 can additionally be compiled in a report for analysis by the operator and saved for later review, such as in computer readable medium 108B (FIG. 1). The report can include all of the data generated during the function checks, such as individual level readings, volume calculations, averages and the like. Additionally, data collected by fluid handling system 200 can be transmitted over a network to a central database for monitoring of fluid handling system 200. The data can be monitored over time and analyzed for trends so perform predictive maintenance and to improve the ability to compensate or adjust the fluid dispenser. Furthermore, adjustments of fluid handling system 200 can be performed from the cloud via remote operator in lieu of being performed directly from control computer 108.

As such, method 600 can be performed with little interaction from the user. For example, the user need only verify that fluid handling system 200 has access to the test fluid and the test reservoir or item of labware. Also, the user may be prompted to check particular features of fluid handling system 200 in order to take corrective action. For example, fluid handling system 200 may determine that the fluid dispenser is dispensing an amount of fluid significantly lower than a volume requested such that a hard fail is determined. Fluid handling system can utilize imaging device 206 to view the source reservoir at inputs 670A or 670B to determine if test fluid is present and, if not present, direct user at output device 108E (FIG. 1) to fill the source reservoir, etc.

FIG. 9 is a line diagram illustrating method 700 for measuring fluid transferred with a pipette tip 608 of manifold 300 of FIGS. 6 and 7. Method 700 can additionally be applied to the fluid handling system of FIGS. 11 and 12.

At step 702, method 700 can commence from step 660A or 660B of FIG. 9. Step 702 can comprise a pre-step of washing the designated destination well of steps 672A and 672B. One of pipette tips 608 (FIG. 6) not used in the volumetric dispensing evaluation can be used to dispense a wash fluid to the designated destination well. Another of pipette tips 608 can be used to remove the wash fluid.

At step 702, the initial volume or quantity of inputs 664A and 664B of source fluid from inputs 670A and 670B can be dispensed into the designated destination well of steps 672A and 672B. For example, for a low-range volume, check data processor 108A can determine that a low range destination well is loaded onto deck 220 using imaging device 206. In an example, the low-range destination well can comprise a well plate having a plurality of wells of the same size that can be loaded onto one of destinations L1-L16 of deck 220. Transport device 141 (FIG. 3) can move manifold 600 (FIG. 6) to the location of the source fluid, move one of pipette tips 608 (FIG. 6) into the source fluid, draw the initial volume into pipette tip 608, move manifold 600 to the designated destination well, and release the initial volume of fluid into the destination well.

At step 704, the height of the liquid dispensed at step 702 can be sensed. For example, pipette tip 608 (FIG. 6) can be moved by transport device 141 (FIG. 3) until the distal point of tip 608 makes contact with the liquid. Manifold 600 (FIG. 6) can withdraw pipette tip 608 from the designated destination well and reinsert pipette tip 608 until contact is made with the fluid. In additional examples, a different pipette tip 608 can be used to perform the liquid level sensing instead of the pipette tip 608 being evaluated for volume transfers. At such point, fluid handling system 200 can sense a change in capacitance between pipette tip 608 and capacitance sensor 616. When pipette tip 608 is not in contact with a liquid, the signal is low. However, when pipette tip 608 contacts liquid, there is a large jump in the signal strength. As such, fluid handling system 200 can know the three-dimensional location of the distal point of pipette tip 608 relative to deck 220. For example, fluid handling system 200 can know the (X, Y, Z) coordinates of the initial level of liquid in the low-range destination well.

At step 706, the initial level can be used to determine the initial volume. Because fluid handling system 200 can also know the locations of the bottoms of the destination wells of steps 672A and 672B as well as the offsets for the destination wells, fluid handling system 200 can compute the initial volume dispensed. In any event, the location of the initial height sensed can serve as a baseline level to which additional volumes can be added and, hence additional levels can be sensed.

At step 708, the target volume or quantity can be transferred to the destination well. Transport device 141 (FIG. 3) can move manifold 600 (FIG. 6) from the location of the designated destination well back to the location of the source well. Pipette tip 608 can again be inserted into the test liquid to draw a target volume into pipette tip 608. Pipette tip 608 can then be withdrawn from the source well and transport device 141 can move manifold 600 back to the designated destination well. Manifold 600 can then be operated to dispense the target volume into the destination well.

At step 710, the new liquid level in the destination well can be sensed. For example, capacitance sensor 616 can be used as described herein to determine the location in three-dimensional space relative to deck 220 of the new liquid level. Manifold 600 (FIG. 6) can withdraw pipette tip 608 from the designated destination well and reinsert pipette tip 608 until contact is made with the fluid. When pipette tip 608 is not in contact with a liquid, the signal is low. However, when pipette tip 608 contacts liquid, there is a large jump in the signal strength. As such, fluid handling system 200 can know the three-dimensional location of the distal point of pipette tip 608 relative to deck 220 and the new liquid level can be marked. For example, fluid handling system 200 can know the (X, Y, Z) coordinates of the new level of liquid in the low-range destination well.

At step 712, the actual volume or test volume of the target quantity can be calculated. For example, data processor 108A (FIG. 1) can subtract the initial liquid level from the new liquid level to obtain a length in, for example, millimeters. The difference can then be divided by the slope in, for example, mm/μl, of the designated destination well to obtain the volume in μl. In additional examples, the actual volume can be calculated by multiplying the difference in length by the cross-sectional area of the receiving well, which can be stored within computer readable medium 108B (FIG. 1).

At step 714, the calculated test volume can be output to fluid handling system 200. For example, data processor 108A (FIG. 1) can store the calculated volume in computer readable medium 108B (FIG. 1). The calculated volume can provide an indication of the volume that pipette tip 608 actually moved from the source well to the designated destination well.

Data processor 108A can then compare the calculated test volume to the predetermined threshold volumes stored in computer readable medium 108B for hard and soft fails, such as at step 679 (FIG. 8). For example, a hard fail can be when the calculated volume is approximately 60% larger or smaller than the target volume. In examples, a soft fail can be when the calculated volume is approximately 5% larger or smaller than the target volume.

In additional examples, the actual volume transferred (e.g., the calculated test volume) can be one of a plurality of actual volumes transferred that are measured to determine a statistical data set from which pass/fail or go/no go conditions are determined for the function checks. Such calculations can be useful in performing function checks on fluid dispensers having independent plungers, such as those shown in FIG. 11. Steps 702-714 can be repeated multiple times to generate multiple incremental target volume samples, e.g., incremental test volumes or test quantities, upon which a statistical analysis can be performed to evaluate the accuracy of the volume of liquid being transferred by pipette tip 608. For example, a plurality of target volume calculations for each liquid dispenser, e.g., each pipette tip 608, can be obtained to generate a reference parameter. Thus, for the eight pipette tips 608 of FIG. 6, three target volumes can be obtained for each and the twenty-four total target volumes can be averaged together to obtain a reference parameter, such as an average reference volume or a baseline target volume. An average of the three target volumes for each individual pipette tip 608 can be compared to the reference parameter to determine pass/fail or go/no go conditions for each pipette tip 608.

Figure 10:
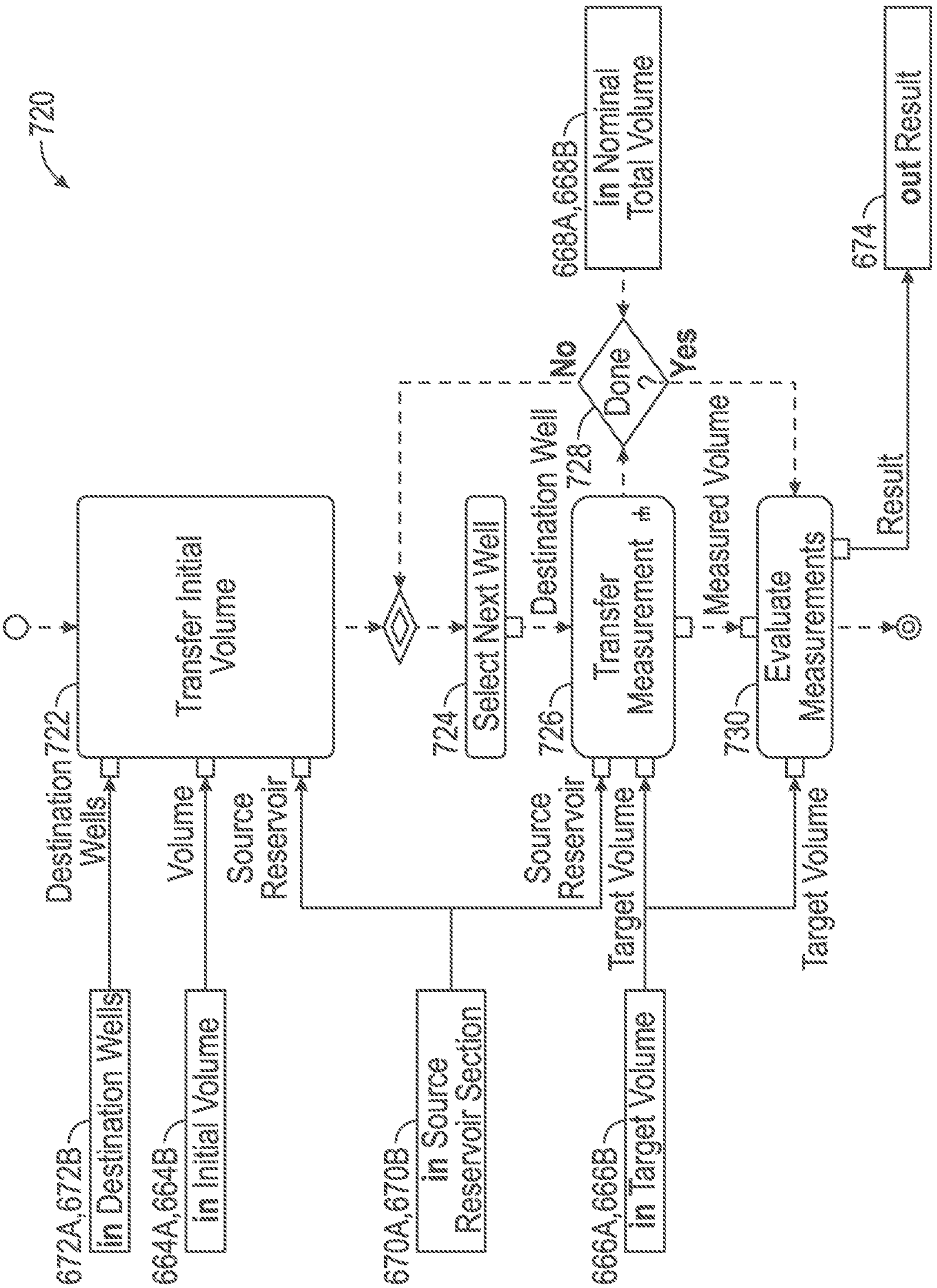
FIG. 10 is a line diagram illustrating steps for checking volume of a pipette tip of the manifold of FIGS. 6 and 7.

FIG. 10 is a line diagram illustrating method 720 for checking volume of pipette tip 608 of manifold 600 of FIGS. 6 and 7. Method 720 and variations thereof can additionally be applied to the fluid handling system of FIGS. 11 and 12. FIG. 10 illustrates a process for gathering target volume data for a plurality of target volume measurements at a plurality of wells.

At step 722, an initial volume or quantity of liquid can be transferred into a plurality of wells of an item of labware as the selected destination wells of input 672A or 672B. Transport device 141 (FIG. 3) can be operated as described herein to transport test fluid from a source volume to the selected destination wells.

At step 724, a first of the wells can be filled with a target volume or quantity of liquid, such as by operating transport device 141 (FIG. 3) as described herein.

At step 726, the target volume transferred into the selected well can be measured, as is described with reference to FIG. 9. For example, the native liquid level sensing capabilities of the fluid handling system 200, such as capacitance sensing capabilities, can be used to sense the level of liquid in the selected well. Using appropriate conversion information stored in fluid handling system 200, such as slope or level-to-volume conversions, the volume of the target volume can be assessed as described herein. Target volumes can be transferred and measured until the nominal total volume of input 668A or 668B is reached.

At step 728, method 720 can determine if additional wells need to be filled using a different pipette tip 608. If additional pipette tips 608 need to be checked, method 720) can move to step 724 so that step 726 can be repeated using a different pipette tip 608 and a different destination well. If additional pipette tips 608 do not need to be checked, method 720 can move to step 730 where the target volume measurements can be evaluated.

At step 730, the target volumes for each well can be averaged together. In examples, each set of four consecutive target volume measurements for each pipette tip 608 can be averaged together. Averaging of the target volumes can help compensate for liquid effects within the well, such as droplets or surface tension affecting meniscus shape, etc. The averaged target volumes can be an indication of the actual volume transferred in each instance. The averaged target volumes can then be compared to threshold data available to fluid handling system 200 as described herein to determine if a hard or soft fail has occurred. If a soft fail has occurred, fluid handling system 200 can adjust the calibration of the fluid dispenser, such as by adjusting an actuation parameter for said fluid dispenser, e.g., a piston stroke, a time a pump or motor is activated, a stepper motor movement and the like, and repeating the process until the actual fluid dispensed for the fluid dispenser is within a tolerance band of being acceptable. If a hard fail has occurred, fluid handling system 200 can be put into a maintenance mode where fluid dispensing is disabled and a corresponding warning can be provided to the user at an operator interface.

FIG. 11 is a schematic diagram of fluid handling system 800 comprising a plurality of fixed probes 802A-802C having fixed tips. Fixed probes 802A can comprise probe 804A and pump 806A, which can comprise plunger 808A and valve 810A. Fixed probes 802B can comprise probe 804B and pump 806B, which can comprise plunger 808B and valve 810B. Fixed probe 802C can comprise probe 804C and pump 806C, which can comprise plunger 808C and valve 810C. Fixed probe 802C can additionally be connected to pump 806D, which can comprise plunger 808D and valve 810D. Fluid handling system 800 can further comprise main manifold 812, sub-manifold 814 and source volume container 816.

Probes 804A-804C can comprise conductive material and can be fabricated of stainless-steel tubes, such as that of hypodermic tube stock. Additionally, the fixed probes can be covered with a plurality of conductive and non-conductive coatings, such as Teflon and a plurality of coatings that provide surface wettability optimization. Probes 804A-804C can be inserted into a volume of liquid and plungers 808A-808D can be activated to draw fluid into probes 808A-804C for dispensing at another location. Probes 804A-804C can be mounted to a transportation system, such as transport device 141 (FIG. 3), to be moved in three-dimensions relative to deck 220 (FIG. 3). Tubes can connect probes 804A-804C to valves 810A-810D. The tubes can be flexible to permit probes 804A-804C to move relative to valves 810A-810D. Valves 810A-810D can additionally be connected to manifold 812 via tubes, and manifold 812 can further be connected to source volume container 816 via a tube. Manifold 812 can fluidly couple source volume container 816 to each of valves 810A-810D. Valves 810A-810D can alternatively connect to probes 804A - 804C and source volume container 816. Pumps 806A-806C can comprise syringe type precision pumps for aspirating liquid of source volume container 816 into to use as the medium of transfer with the probes 804A-804C. System fluid source container 816 supplies the medium used to transfer the reagent or specimen from one location to another using fixed probes 804A thru 804C. The system fluid medium is separated from the reagent or specimen by an air gap to avoid contamination and diffusion. As such, actuation of plungers 808A-808D can be configured to either pull fluid from source volume container 816 and push fluid into probes 804A-804C during the priming sequence. Thereafter, the fluid transfers pull fluid from the source of the transfer with probes 804A-804C and dispense the aspirated fluid at the destination location using probes 804A-804C. Additionally, sub-manifold 814 can allow valves 810C and 810D to share a path to probe 804A.

FIG. 12 is a diagram illustrating one of the fixed probes 802A-802C of FIG. 11 coupled with a capacitance sensor 820. Fixed probes 802A can comprise probe 804A connected to housing 822. In examples, housing 822 can be connected to carriage 250 (FIG. 3) thru the Z axis assembly 829 to be mobile within the workspace of fluid handling system 200 (FIG. 2). Housing 822 can include internal volume 824 in which hose 826 can be connected. Hose 826 can be connected to source volume container 816 via valve 810A and manifold 812 (FIG. 11) for priming. Capacitance sensing board 828 can be electronically connected to probe 804A and capacitance sensor 820 can be mounted to capacitance sensing board 828. Capacitance sensing board 828 can be connected to a fluid handling system controller such as data processor 108A (FIG. 1) thru an interface (Aced board not shown), or controller 214 (FIG. 2).

FIGS. 11 and 12 illustrate another example of a fluid handling system in which a plurality of individually actuatable liquid dispensers is included. Each individual liquid dispenser can comprise a liquid level sensor, such as a capacitance sensor. Any of the function checks described herein can be performed using fixed probes 802A-802C and an associated liquid level sensor, such as a capacitance sensor 820 described with reference to FIG. 12.

Figure 13A:
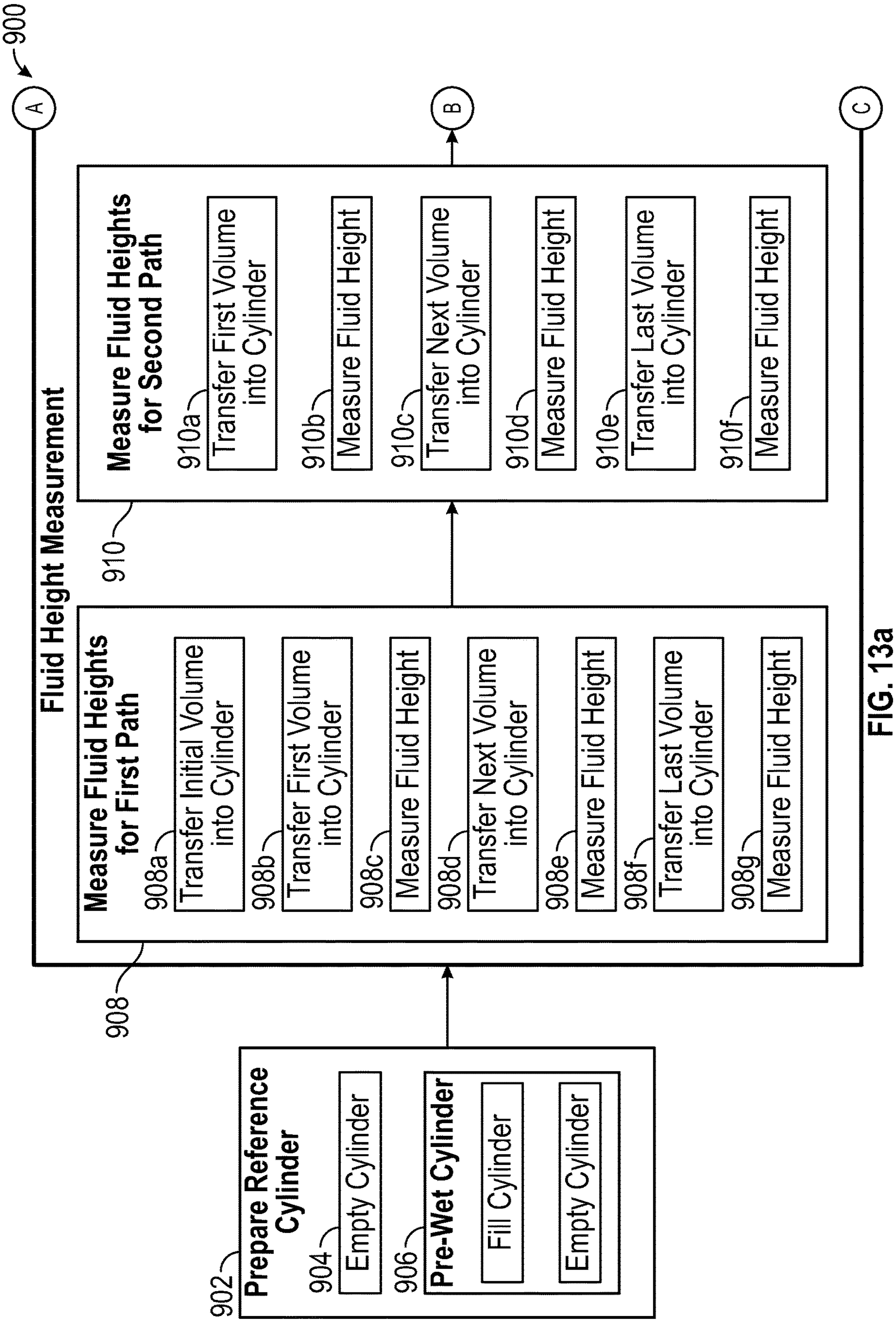
FIGS. 13*a* and 13*b* are a line diagram illustrating steps for checking quality control of a fluid handling system comprising steps for conducting fluid height measurements.
Figure 13B:
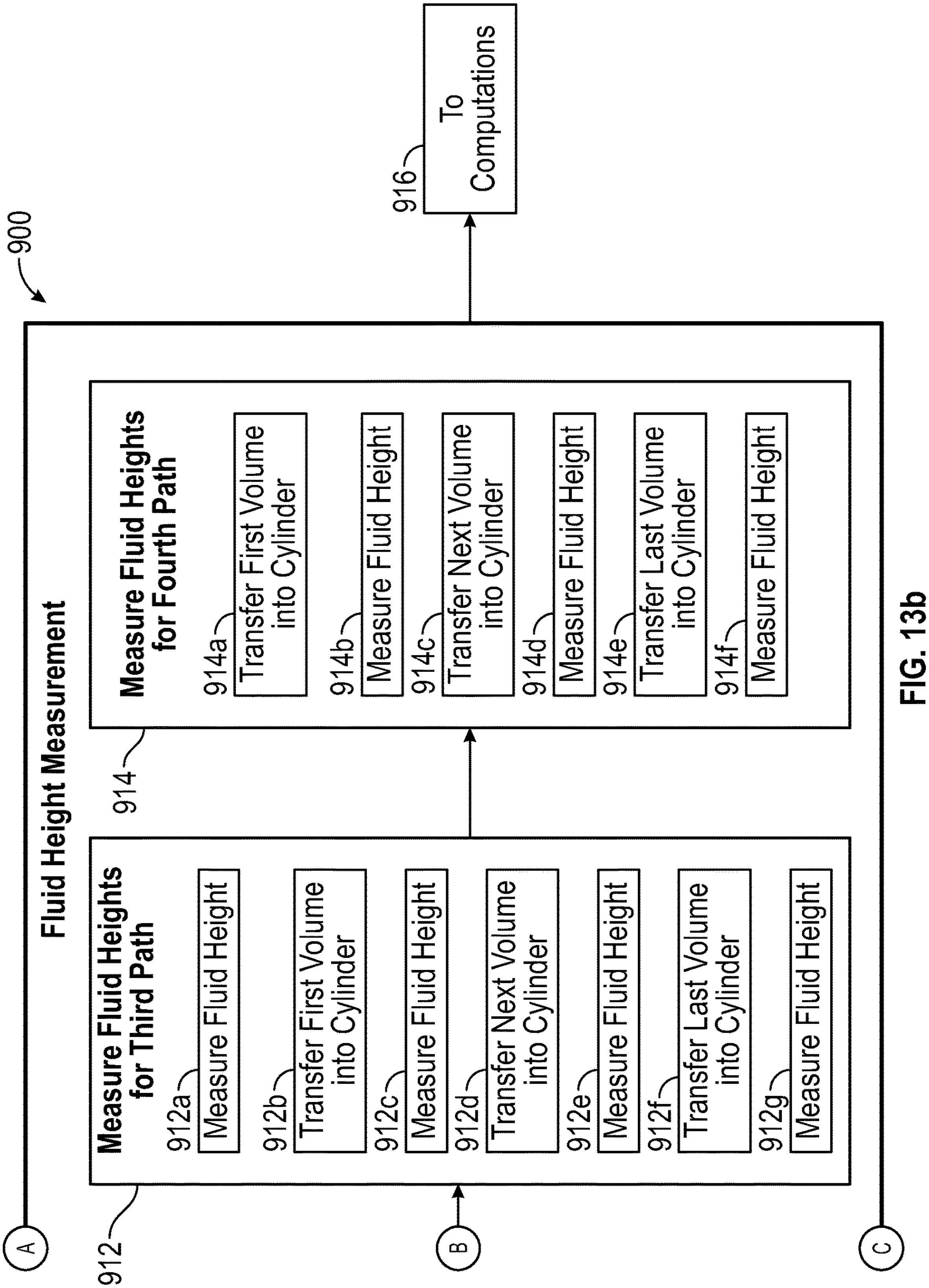

FIG. 13 is a line diagram illustrating steps for method 900 of checking quality control of a fluid handling system, such as fluid handling system 800 of FIG. 11. Method 900 can comprise steps for conducting fluid height measurements of liquid dispensed, e.g., dosed, into a reference volume. In examples, the liquid can be dispensed using fixed probes 802A-802C and pumps 806A-806D of FIGS. 11 and 12, though any of the liquid dispensing devices described herein can be used. Method 900 is described with a reference to a cylinder (not shown), the cylinder is an electrically grounded, precision metal component with a height of not less than 39 mm. Though any of the reference cylinders having equivalent physical characteristics may be used. In an example, the cylinder can comprise cup 226 of FIG. 4 or a similar cup or cylinder embedded in, attached to, or disposed on a deck or platform of a liquid handling system. Method 900 can be executed automatically without intervention from a user, such as upon activation of the fluid handling system. Instructions for the fluid handling system to execute method 900 can be stored in a computer readable storage medium that can be accessed by a controller of the liquid handling system to, for example, operate the liquid transfer device, take fluid height measurements, compare measurements to stored threshold data and the like.

At step 902, a reference cylinder can be prepared for use. At step 904, the reference cylinder can be emptied by using a liquid transfer device to remove any residual liquid therein, if any. At step 906, reference cylinder can be pre-wet. The pre-wet operation is performed by probe 802C and pump 806D having the appropriate fluid transfer capacity for the pre-wet operation of the reference cylinder. Although, in other examples, any of the liquid dispensing devices described herein, such as fixed probes 802A-802C, can be used to dispense a fluid to the reference cylinder. Then, the reference cylinder can be emptied using the same probe and pump. Step 906 ensures that the reference cylinder is empty of residual fluid prior the volume confirmation sequence.

At step 908, the fluid heights for a first path can be measured. For example, at step 908*a,* pump 806D of fixed probe 802C can be used to dispense an initial volume or dose into the reference cylinder. At step 908*b,* a first volume or dose of liquid to be measured can be dispensed into the reference cylinder using pump 806D of fixed probe 802C. At step 908*c,* the height of the combined fluids from the initial volume and the first volume can be measured. For example, a capacitive-based liquid level sensing system can be used, such as one incorporated into the liquid dispenser. At step 908*d,* a second volume or dose of liquid to be measured can be dispensed into the reference cylinder using pump 806D of fixed probe 802C. At step 908*e,* the height of the combined fluids from the initial volume, the first volume and the second volume can be measured using the liquid level system. At step 908*f,* a third volume or dose of liquid to be measured can be dispensed into the reference cylinder using pump 806D of fixed probe 802C. At step 908*g,* the height of the combined fluids from the initial volume, the first volume, the second volume and the third volume can be measured using the liquid level system.

At step 910, the fluid heights for a second path can be measured. For example, at step 910*a,* a first volume or dose of liquid to be measured can be dispensed into the reference cylinder using pump 806C of fixed probe 802C on top of the existing volume already in the reference cylinder. At step 910*b,* the height of the fluid from the first volume can be measured. For example, a capacitive-based liquid level sensing system can be used, such as one incorporated into the liquid dispenser. At step 910*c,* a second volume or dose of liquid to be measured can be dispensed into the reference cylinder using pump 806C of fixed probe 802C. At step 910*d,* the height of the combined fluids from the existing volume, the first volume and the second volume can be measured using the liquid level system. At step 910*e,* a third volume or dose of liquid to be measured can be dispensed into the reference cylinder using pump 806C of fixed probe 802C. At step 910*f,* the height of the combined fluids from the existing volume, the first volume, the second volume and the third volume can be measured using the liquid level system.

At step 912, the fluid heights for a third path can be measured. At step 912*a,* the initial volume of fluid existing within the reference cylinder can be measured. At step 912*b,* a first volume or dose of liquid to be measured can be dispensed into the reference cylinder using pump 806B of fixed probe 802B. At step 912*c,* the height of the combined fluids from the existing volume and the first volume can be measured. For example, a capacitive-based liquid level sensing system can be used, such as one incorporated into the liquid dispenser. At step 912*d,* a second volume or dose of liquid to be measured can be dispensed into the reference cylinder using pump 806B of fixed probe 802B. At step 912*e,* the height of the combined fluids from the existing volume, the first volume and the second volume can be measured using the liquid level system. At step 912*f,* a third volume or dose of liquid to be measured can be dispensed into the reference cylinder using pump 806B of fixed probe 802B.

At step 912*g,* the height of the combined fluids from the existing volume, the first volume, the second volume and the third volume can be measured using the liquid level system. At step 914, the fluid heights for a fourth path can be measured. For example, at step 914*a,* a first volume or dose of liquid to be measured can be dispensed into the reference cylinder using pump 806A of fixed probe 802A on top of the existing volume already in the reference cylinder. At step 914*b,* the height of the fluid from the first volume can be measured. For example, a capacitive-based liquid level sensing system can be used, such as one incorporated into the liquid dispenser. At step 914*c,* a second volume or dose of liquid to be measured can be dispensed into the reference cylinder using pump 806A of fixed probe 802A. At step 914*d,* the height of the combined fluids from the existing volume, the first volume and the second volume can be measured using the liquid level system. At step 914*e,* a third volume or dose of liquid to be measured can be dispensed into the reference cylinder using pump 806A of fixed probe 802A. At step 914*f,* the height of the combined fluids from the existing volume, the first volume, the second volume and the third volume can be measured using the liquid level system.

Thus, steps 908-914 can dispense 13 volumes of doses of liquid into the reference cylinder: an initial volume and three volumes for each of the fluid pathways incorporating pumps 806A-806D. From these different doses, thirteen height measurements can be made to determine 12 different volumes. The fluid height measurements of steps 908-914 and the volumes determined therefrom can be used to perform quality control checks on the fluid handling system, using method 920 of FIG. 14. Steps 908-914 are described with reference to using a single reference container into which to dispense the doses. Additionally, the steps described in method 900 need not be limited to the number of doses discussed. Neither are they limited to the number of fluid height measurement performed per dose. Also, the steps can be split into multiple sequences. For example, a sequence can have more doses that can be placed in single reference cylinder. Therefore, the reference cylinder can be emptied one or more times to repeat the steps discussed in method 900.

Figure 14A:
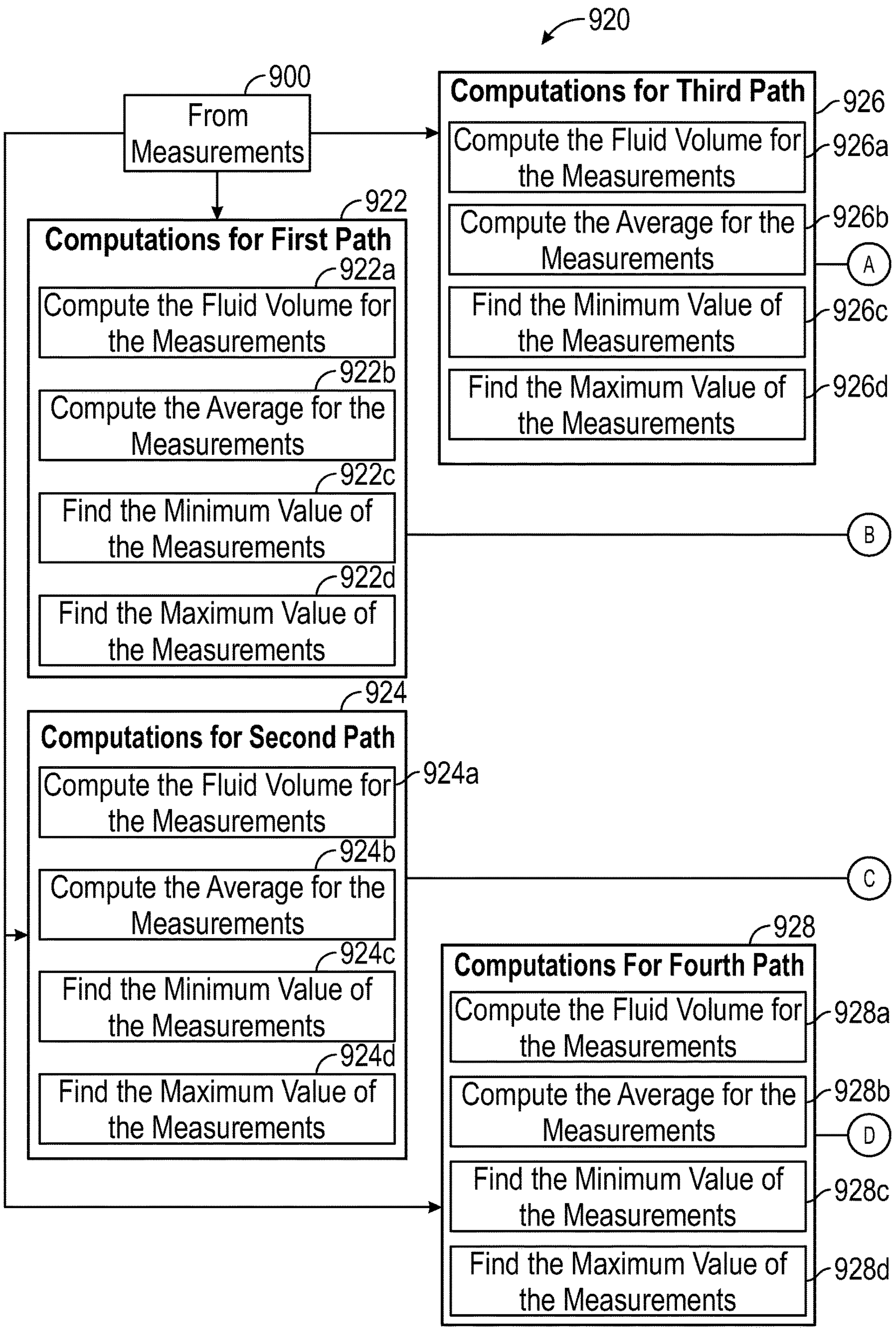
FIGS. 14*a* and 14*b* are a line diagram illustrating steps for performing computations on the fluid height measurements obtained in FIG. 13.
Figure 14B:
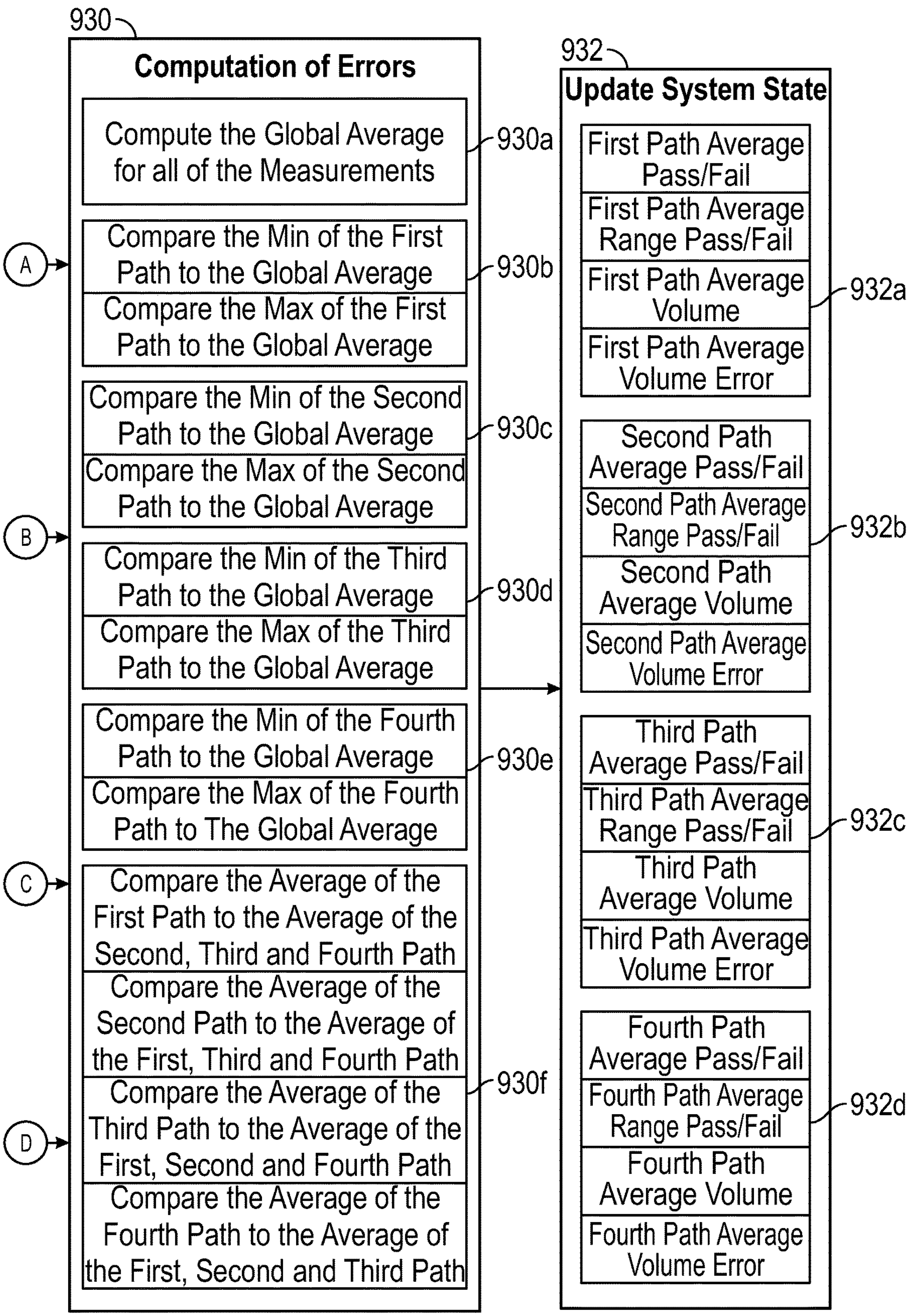

FIG. 14 is a line diagram illustrating steps for method 920 of performing computations on the fluid height measurements obtained using method 900 of FIG. 13.

At step 922, computations from the first path of step 908 can be evaluated. At step 922*a,* the fluid volumes for the fluid transfers using pump 806D of fixed probe 802C can be computed. For example, a first height of the first volume dose (908*c*) and a second height of the second volume dose (908*e*) can be used to determine a length that can be multiplied by the area of the reference cylinder to determine a first volume. Step 922*a* can involve determining the volumetric areas of the dispensed volume doses for the first, second and third volumes of steps 908*b,* 908*d* and 908*f* by determining the height or length of fluid between each dose and multiplying that length by the area of the reference cylinder to determine a volume.

At step 922*b,* the average of the first, second and third volumes for pump 806D of fixed probe 802C can be calculated.

At step 922*c,* the smallest or minimum of the first, second and third volumes for pump 806D of fixed probe 802C can be determined.

At step 922*d,* the largest or maximum of the first, second and third volumes for pump 806C of fixed probe 802C can be determined.

At step 924, computations from the second path of step 910 can be evaluated. At step 924*a,* the fluid volumes for the fluid transfers using pump 806C of fixed probe 802C can be computed. For example, a first height of the first volume dose (910*b*) and a second height of the first volume dose (910*d*) can be used to determine a length that can be multiplied by the area of the reference cylinder to determine a first volume. Step 924*a* can involve determining the volumetric areas of the first dispensed volume dose for the first, second and third volumes of steps 910*a,* 910*c* and 910*e* by determining the height or length of fluid between each dose and multiplying that length by the area of the reference cylinder to determine a volume.

At step 924*b,* the average of the first, second and third volumes for pump 806C of fixed probe 802C can be calculated.

At step 924*c,* the smallest or minimum of the first, second and third volumes for pump 806C of fixed probe 802C can be determined.

At step 924*d,* the largest or maximum of the first, second and third volumes for pump 806C of fixed probe 802C can be determined.

At step 926, computations from the third path of step 912 can be evaluated. At step 926*a,* the fluid volumes for the fluid transfers using pump 806B of fixed probe 802B can be computed. For example, a first height of the first liquid (912*c*) and a second height of the first volume dose (912*e*) can be used to determine a length that can be multiplied by the area of the reference cylinder to determine a first volume.

Step 926*a* can involve determining the volumetric areas of the first dispensed volume dose for the first, second and third volumes of steps 912*b*, 912*d* and 912*f* by determining the height or length of fluid between each dose and multiplying that length by the area of the reference cylinder to determine a volume.

At step 926*b*, the average of the first, second and third volumes for pump 806B of fixed probe 802B can be calculated.

At step 926*c*, the smallest or minimum of the first, second and third volumes for pump 806B of fixed probe 802B can be determined.

At step 926*d*, the largest or maximum of the first, second and third volumes for pump 806B of fixed probe 802B can be determined.

At step 928, computations from the fourth path of step 914 can be evaluated. At step 928*a*, the fluid volumes for the fluid transfers using pump 806A of fixed probe 802A can be computed. For example, a first height of the first volume dose (914*b*) and a second height of the first volume dose (914*d*) can be used to determine a length that can be multiplied by the area of the reference cylinder to determine a first volume. Step 928*a* can involve determining the volumetric areas of the first dispensed volume dose for the first, second and third volumes of steps 914*a*, 914*c* and 914*e* by determining the height or length of fluid between each dose and multiplying that length by the area of the reference cylinder to determine a volume.

At step 928*b*, the average of the first, second and third volumes for pump 806A of fixed probe 802A can be calculated.

At step 928*c*, the smallest or minimum of the first, second and third volumes for pump 806A of fixed probe 802A can be determined.

At step 928*d*, the largest or maximum of the first, second and third volumes for pump 806A of fixed probe 802A can be determined.

At step 930, computation of error or potential errors can be conducted.

At step 930*a*, the global average of all the volumes of steps 922, 924, 926 and 928 can be computed.

At step 930*b*, the minimum calculated at step 922*c* can be compared to the global average of step 930*a* and the maximum calculated at step 922*d* can be compared to the global average of step 930*a*.

At step 930*c*, the minimum calculated at step 924*c* can be compared to the global average of step 930*a* and the maximum calculated at step 924*d* can be compared to the global average of step 930*a*.

At step 930*d*, the minimum calculated at step 926*c* can be compared to the global average of step 930*a* and the maximum calculated at step 926*d* can be compared to the global average of step 930*a*.

At step 930*e*, the minimum calculated at step 928*c* can be compared to the global average of step 930*a* and the maximum calculated at step 928*d* can be compared to the global average of step 930*a*.

At step 930*f*, the average from each path can be compared to the average of the averages of the other three paths. For example, the average of the first path calculated at step 922*b* can be compared to the average of the average volumes calculated at steps 924*b*, 926*b* and 928*b*, the average of the second path calculated at step 924*b* can be compared to the average of the average volumes calculated at steps 922*b*, 926*b* and 928*b*, the average of the third path calculated at step 926*b* can be compared to the average of the average volumes calculated at steps 922*b*, 924*b* and 928*b*, and the average of the fourth path calculated at step 928*b* can be compared to the average of the average volumes calculated at steps 922*b*, 924*b* and 926*b*.

At step 932, the fluid handling system controller is updated with the results of method 900 and the fluid handling system state (ready/not ready) can be updated based on the outcomes of method 900 and step 930.

At step 932*a*, the first path can be evaluated. The average of the first path calculated at step 922*a* can be compared to a target value stored in the fluid handling system or made available to the fluid handling system via a network. Thus, if the average determined at step 922*b*, is within a +/− of the target value, the system can pass, and the operator can be notified. If the average determined at step 922B is outside of the +/− of the target value, the system can fail, and the operator can be notified.

Additionally, the range of the volumes calculated at step 922*a* can be determined and compared to a threshold range value stored in the fluid handling system or made available to the fluid handling system via a network. Thus, if the determined range is within a +/− threshold range value, the system can pass, and the operator can be notified. If the determined range is outside of the +/− threshold range value, the system can fail, and the operator can be notified.

If measurements are deemed to have failed, the liquid handling system can be put in a maintenance mode where user interventions, such as from a service technician, can be required to fix any mechanical or physical deficiencies with the system before proceeding. If measurements are deemed to have passed, the liquid handling system can be put into an operating mode so a user can conduct normal operations.

Alternatively, the average of the individual fluid paths can be compared to the average of the averages of the other three fluid paths. Thus, if the average determined at step 922*b*, is within a +/− of the average of the averages determined in steps 924*b*, 926, and 928*b*, the system can pass, and the operator can be notified. At step 932*b*, the pass/fail analysis described with reference to the first fluid path can be conducted for the second fluid path.

At step 932*c*, the pass/fail analysis described with reference to the first fluid path can be conducted for the third fluid path.

At step 932*d*, the pass/fail analysis described with reference to the first fluid path can be conducted for the fourth fluid path.

As such, by operating the liquid handling system to dispense known, programmed or requested liquid volumes or doses, the doses can be analyzed to determine if the liquid handling system is operating satisfactorily. For example, if the liquid handling system is operating satisfactorily, the doses for each liquid transfer path should be within a tolerance band of the known, programmed or requested liquid volume or does. If so, this would indicate a healthy liquid handling system. If not, this can be indicative that something within the liquid handling system is malfunctioning or not working properly. Thus, a user can be notified that corrective action is desirable and the system can be disabled to prevent further use. Additionally, FIGS. 13*a*-14*b* describe a particular sequence of steps with reference to particular probes and pumps, but the methods described herein can be applied using a different sequence of probes and pumps without departing from the concepts of the present disclosure of evaluating functionality or operability of a fluid handling system.

EXAMPLES

Example 1 is a method for performing a function check of a fluid handling system, the method comprising: dispensing a first reference dose of a fluid into a reference container using a first fluid dispenser; measuring a first fluid height of the first reference dose in the reference container with a fluid level sensing system of the fluid handling system; and changing a status of the fluid handling system based on the measured first fluid height.

In Example 2, the subject matter of Example 1 optionally includes wherein changing a status of the fluid handling system based on the first measured reference fluid height comprises toggling between: disabling further functionality of the fluid handling system by a user of the fluid handling system; and putting the fluid handling system into an operating mode operable by the user of the fluid handling system.

In Example 3, the subject matter of any one or more of Examples 1-2 optionally include wherein changing a status of the fluid handling system based on the first measured reference fluid height comprises toggling between: a normal mode where user-initiated operation of the fluid handling system is enabled; and an error mode where user-initiated operation of the fluid handling system is restricted.

In Example 4, the subject matter of any one or more of Examples 1-3 optionally include wherein changing a status of the fluid handling system based on the first measured reference fluid height comprises toggling between: a normal mode where user-initiated operation of the fluid handling system is enabled; and a calibration mode where the fluid handling system self-adjusts based on the measured reference fluid height.

In Example 5, the subject matter of any one or more of Examples 1-4 optionally include determining a first volume of dispensed fluid of the first reference dose based on the measured first fluid height, wherein changing the status of the fluid handling system is based on the determined first volume.

In Example 6, the subject matter of Example 5 optionally includes dispensing a second reference dose of the fluid; measuring a second fluid height of the second reference dose with the fluid level sensing system of the fluid handling system; and determining a second volume of dispensed fluid of the second reference dose based on the measured second fluid height, wherein changing the status of the fluid handling system is based on the determined first volume and the determined second volume.

In Example 7, the subject matter of Example 6 optionally includes wherein the first reference dose and the second reference dose are intended to be approximately equal.

In Example 8, the subject matter of Example 7 optionally includes calculating an average volume dispensed using at least the determined first volume and the determined second volume; and determining if the average volume dispensed is above or below a threshold volume.

In Example 9, the subject matter of any one or more of Examples 5-8 optionally include wherein changing the status of the fluid handling system based on the determined first volume comprises adjusting calibration of the first fluid dispenser.

In Example 10, the subject matter of any one or more of Examples 1-9 optionally include determining if the measured first fluid height is above or below a threshold height, wherein changing the status of the of the fluid handling system is based on whether the measured first fluid height is above or below the threshold height.

In Example 11, the subject matter of Example 10 optionally includes dispensing a second reference dose of the fluid into the reference container using a second fluid dispenser; measuring a second fluid height of the second reference dose with the fluid level sensing system of the fluid handling system; and determining if the measured second fluid height is above or below the threshold height, wherein changing the status of the fluid handling system is based on whether the measured first fluid height or the measured second fluid height is above or below the threshold height.

In Example 12, the subject matter of any one or more of Examples 10-11 optionally include dispensing a second reference dose of the fluid into a second reference container using a second fluid dispenser; measuring a second fluid height of the second reference dose with the fluid level sensing system of the fluid handling system; and determining if the measured second fluid height is above or below the threshold height, wherein changing the status of the fluid handling system is based on whether the measured first fluid height or the measured second fluid height is above or below the threshold height, wherein the first fluid dispenser and the second fluid dispenser dispense the first and second reference doses contemporaneously into the first and second reference containers.

In Example 13, the subject matter of any one or more of Examples 1-12 optionally includes evaluating functionality of the fluid handling system from the first measured reference fluid height.

In Example 14, the subject matter of Example 13 optionally includes the function check comprising at least one of determining: acceptable functionality of the fluid handling system; a soft fail of the fluid handling system correctable by the fluid handling system; and a hard fail of the fluid handling system requiring external correction.

In Example 15, the subject matter of any one or more of Examples 13-14 optionally includes evaluating functionality of the fluid handling system from the first measured reference fluid height is automatically initiated at startup of the fluid handling system.

In Example 16, the subject matter of any one or more of Examples 13-15 optionally includes dispensing multiple incremental test doses of equal volume of the fluid into the reference container using the first fluid dispenser; sensing incremental fluid levels after each incremental test dose is dispensed into the reference container, using the fluid level sensing system; and determining a test volume of fluid dispensed for each incremental test dose based on the sensed incremental fluid levels.

In Example 17, the subject matter of Example 16 optionally includes the function check comprising a check of the operability of the first fluid dispenser.

In Example 18, the subject matter of any one or more of Examples 16-17 optionally includes averaging the determined test volumes of fluid dispensed to determine an average volume; and comparing the average volume to a reference parameter to evaluate the functionality.

In Example 19, the subject matter of any one or more of Examples 16-18 optionally includes the function check comprising performing a calibration of the first fluid dispenser.

In Example 20, the subject matter of Example 19 optionally includes averaging the determined test volumes of reference fluid dispensed to determine a slope and offset for the first fluid dispenser; and adjusting the first fluid dispenser so that the first fluid dispenser is configured to dispense fluid equal to values called for by a user of the fluid handling system.

In Example 21, the subject matter of any one or more of Examples 19-20 optionally includes calibration of the first fluid dispenser being performed for two different volume displacements of the first fluid dispenser.

In Example 22, the subject matter of Example 21 optionally includes calibration for the two different volumes being performed sequentially in the reference container.

In Example 23, the subject matter of any one or more of Examples 16-22 optionally includes the function check comprising performing a quality control diagnosis of functioning of the fluid handling system.

In Example 24, the subject matter of Example 23 optionally includes averaging the determined test volumes of reference fluid dispensed to determine an average reference volume; and comparing each incremental determined test volume dispensed to the average reference volume to evaluate the functionality.

In Example 25, the subject matter of any one or more of Examples 13-24 optionally includes: the fluid handling system including a plurality of pipettors; and evaluating functionality of the fluid handling system comprises evaluating functionality of each of the pipettors.

In Example 26, the subject matter of any one or more of Examples 13-25 optionally includes measuring the fluid level in the reference container with the fluid level sensing system of the fluid handling system comprises: sensing a first level of the fluid in the reference container using the fluid level sensing system; dispensing a first test dose of the fluid to the reference container; sensing a second level of the fluid in the reference container using the level sensing system; measuring a difference between the second and first levels of the fluid; and comparing the difference to a reference parameter to evaluate functionality of the fluid handling system.

In Example 27, the subject matter of Example 26 optionally includes sensing the first level of the fluid in the reference container using the fluid level sensing system further comprises: calculating a first test volume of the fluid in the reference container using level-to-volume conversion values stored in computer readable storage medium accessible to the fluid handling system and the sensed first level.

In Example 28, the subject matter of Example 27 optionally includes dispensing the fluid into the reference container comprises: activating the first fluid dispenser to dispense an initial dose into the reference container to generate the first level.

In Example 29, the subject matter of Example 28 optionally includes dispensing the first test dose of the fluid to the reference container by: activating the first fluid dispenser to dispense the first test dose into the reference container to generate the second level.

In Example 30, the subject matter of any one or more of Examples 27-29 optionally includes comparing the difference to the reference parameter to evaluate functionality of the fluid handling system by: calculating a second test volume of the reference fluid; and determining if the second test volume is within a tolerance band of the reference parameter.

In Example 31, the subject matter of any one or more of Examples 13-30 optionally includes: the fluid transferer comprises a pipette system having replaceable pipette tips; the reference container comprises a piece of labware positioned on a deck of the fluid handling system; and the reference parameter comprises a reference value stored in the fluid handling system.

In Example 32, the subject matter of any one or more of Examples 13-31 optionally includes: the fluid transferer comprising a syringe system having a probe including a fixed tip; the reference container comprising an orifice fixed in a deck of the fluid handling system; the reference parameter comprising an average of multiple values obtained by the fluid handling system.

Example 33 is a robotic fluid handling system comprising: a controller; a stationary deck; a fluid reservoir positioned on the deck; a transport device controlled by the controller to move in three-dimensional space; and a fluid dispenser configured to dispense fluid into the fluid reservoir, the fluid dispenser arranged and adapted to be moved in three-dimensional space by the transport device, the fluid dispenser comprising a capacitance sensor, wherein the controller is configured to detect contact of the fluid dispenser with a liquid level disposed in the fluid reservoir based on the amount of capacitance sensed by the capacitance sensor, wherein the controller is further configured to determine operability of the robotic fluid handling system based on the sensed capacitance.

In Example 34, the subject matter of Example 33 optionally includes the controller being further configured to determine a volume of liquid dispensed from the fluid dispenser based on comparing sensed liquid levels to reference information accessible to the controller.

Example 35 is a method for calibrating a fluid handling system, the method comprising: dispensing a reference fluid into a reference container using a fluid dispenser; measuring a first reference fluid level in the reference container with a fluid level sensing system of the fluid handling system; determining a test volume of the reference fluid dispensed into the reference container; and calibrating the fluid dispenser based on the determined test volume.

In Example 36, the subject matter of Example 35 optionally includes: determining a test volume of the reference fluid dispensed into the reference container comprises: dispensing a test quantity of the reference fluid into the reference container using the fluid dispenser; measuring a second reference fluid level in the reference container with the fluid level sensing system of the fluid handling system; and determining a test volume of the reference fluid dispensed into the reference container comprises: determining a volume of reference fluid between the first and second reference fluid levels.

In Example 37, the subject matter of any one or more of Examples 35-36 optionally includes calibrating the fluid dispenser based on the determined test volume by: comparing the determined test volume to a baseline value available to the fluid handling system.

In Example 38, the subject matter of Example 37 optionally includes calibrating the fluid dispenser based on the determined test volume further comprising: adjusting the fluid dispenser so that the fluid dispenser is configured to dispense fluid commensurate with values called for by a user of the fluid handling system.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for performing a function check of a fluid handling system, the method comprising:

dispensing a first reference dose of a fluid into a reference container using a first fluid dispenser;

measuring a first fluid height of the first reference dose in the reference container with a fluid level sensing system of the fluid handling system;

changing a status of the fluid handling system based on the measured first fluid height;

determining a first volume of dispensed fluid of the first reference dose based on the measured first fluid height, wherein changing the status of the fluid handling system is based on the determined first volume;

dispensing a second reference dose of the fluid;

measuring a second fluid height of the second reference dose with the fluid level sensing system of the fluid handling system;

determining a second volume of dispensed fluid of the second reference dose based on the measured second fluid height, wherein changing the status of the fluid handling system is based on the determined first volume and the determined second volume;

calculating an average volume dispensed using at least the determined first volume and the determined second volume; and determining whether the average volume dispensed is above or below a threshold volume.

2. The method of claim 1, wherein changing a status of the fluid handling system based on the first measured reference fluid height comprises toggling between at least one of:

(i) disabling further functionality of the fluid handling system by a user of the fluid handling system; and putting the fluid handling system into an operating mode operable by the user of the fluid handling system;

(ii) a normal mode where user-initiated operation of the fluid handling system is enabled; and an error mode where user-initiated operation of the fluid handling system is restricted; and (iii) a normal mode where user-initiated operation of the fluid handling system is enabled; and a calibration mode where the fluid handling system self-adjusts based on the measured reference fluid height.

3. The method of claim 1, wherein the first reference dose and the second reference dose are intended to be approximately equal.

4. The method of claim 1, wherein changing the status of the fluid handling system based on the determined first volume comprises adjusting calibration of the first fluid dispenser.

5. The method of claim 1, further comprising:

determining if the measured first fluid height is above or below a threshold height, wherein changing the status of the fluid handling system is based on whether the measured first fluid height is above or below the threshold height.

6. The method of claim 5, further comprising:

dispensing the second reference dose of the fluid into the reference container using a second fluid dispenser; and determining if the measured second fluid height is above or below the threshold height, wherein changing the status of the fluid handling system is based on whether the measured first fluid height or the measured second fluid height is above or below the threshold height.

7. The method of claim 5, further comprising:

dispensing the second reference dose of the fluid into a second reference container using a second fluid dispenser; and determining if the measured second fluid height is above or below the threshold height, wherein changing the status of the fluid handling system is based on whether the measured first fluid height or the measured second fluid height is above or below the threshold height, wherein the first fluid dispenser and the second fluid dispenser dispense the first and second reference doses contemporaneously into the first and second reference containers.

8. The method of claim 1, further comprising evaluating functionality of the fluid handling system from the first measured reference fluid height.

9. The method of claim 8, wherein the functionality evaluation comprises at least one of determining:

acceptable functionality of the fluid handling system;

a soft fail of the fluid handling system correctable by the fluid handling system; and a hard fail of the fluid handling system requiring external correction.

10. The method of claim 8, further comprising:

dispensing multiple incremental test doses of equal volume of the fluid into the reference container using the first fluid dispenser;

sensing incremental fluid levels after each incremental test dose is dispensed into the reference container, using the fluid level sensing system; and determining a test volume of fluid dispensed for each incremental test dose based on the sensed incremental fluid levels.

11. The method of claim 10, further comprising:

averaging the determined test volumes of fluid dispensed to determine an average volume; and comparing the average volume to a reference parameter to evaluate the functionality.

12. The method of claim 10, wherein the function check comprises performing a calibration of the first fluid dispenser.

13. The method of claim 12, further comprising:

averaging the determined test volumes of reference fluid dispensed to determine a slope and offset for the first fluid dispenser; and adjusting the first fluid dispenser so that the first fluid dispenser is configured to dispense fluid equal to values called for by a user of the fluid handling system.

14. The method of claim 10, wherein the function check comprises performing a quality control diagnosis of functioning of the fluid handling system.

15. The method of claim 14, further comprising:

averaging the determined test volumes of reference fluid dispensed to determine an average reference volume; and comparing each incremental determined test volume dispensed to the average reference volume to evaluate the functionality.

16. The method of claim 8, wherein measuring the fluid level in the reference container with the fluid level sensing system of the fluid handling system comprises:

sensing a first level of the fluid in the reference container using the fluid level sensing system;

dispensing a first test dose of the fluid to the reference container;

sensing a second level of the fluid in the reference container using the level sensing system;

measuring a difference between the second and first levels of the fluid; and comparing the difference to a reference parameter to evaluate functionality of the fluid handling system.

17. The method of claim 8, wherein:

the first fluid dispenser comprises a pipette system having replaceable pipette tips;

the reference container comprises a piece of labware positioned on a deck of the fluid handling system; and the reference parameter comprises a reference value stored in the fluid handling system.

18. The method of claim 8, wherein:

the first fluid dispenser comprises a syringe system having a probe including a fixed tip;

the reference container comprises an orifice fixed in a deck of the fluid handling system; and the reference parameter comprises an average of multiple values obtained by the fluid handling system.

19. A robotic fluid handling system comprising:

a controller;

a stationary deck;

a fluid reservoir positioned on the deck;

a transport device controlled by the controller to move in three-dimensional space; and a fluid dispenser configured to dispense fluid into the fluid reservoir, the fluid dispenser arranged and adapted to be moved in three-dimensional space by the transport device, the fluid dispenser comprising a capacitance sensor, wherein the controller is configured to detect contact of the fluid dispenser with a liquid level disposed in the fluid reservoir based on the amount of capacitance sensed by the capacitance sensor, wherein the controller is further configured to determine operability of the robotic fluid handling system based on the sensed capacitance;

wherein the controller is further configured to determine a volume of liquid dispensed from the fluid dispenser based on comparing sensed liquid levels to reference information accessible to the controller; and wherein the controller is further configured to determine whether the volume of liquid dispensed from the fluid dispenser is above or below a threshold volume.

* * * * *